US012737372B2

(12) United States Patent
Wigglesworth et al.

(10) Patent No.: US 12,737,372 B2
(45) Date of Patent: Sep. 15, 2026

(54) CUSTOMIZED INTERACTION BETWEEN NETWORKED RESOURCES AND USERS

(71) Applicant: International Business Machines Corporation, Armonk, NY (US)

(72) Inventors: Joseph Paul Wigglesworth, Thornhill (CA); Hao Jiang, London (CA); Konstantinos Kontogiannis, York (CA); Tinny Mei Chi Ng, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 17/990,602

(22) Filed: Nov. 18, 2022

(65) Prior Publication Data

US 2024/0168967 A1 May 23, 2024

(51) Int. Cl.
*G06F 16/25* (2019.01)
*G06F 16/28* (2019.01)

(52) U.S. Cl.
CPC .......... *G06F 16/252* (2019.01); *G06F 16/285* (2019.01)

(58) Field of Classification Search
CPC ............................. G06F 16/252; G06F 16/285
See application file for complete search history.

(56) References Cited

U.S. PATENT DOCUMENTS 6,141,666 A 10/2000 Tobin
7,200,563 B1 * 4/2007 Hammitt ................ G06Q 30/06 705/7.11
7,340,508 B1 3/2008 Kasi et al.
7,529,833 B2 * 5/2009 Cai ......................... H04L 67/51 709/225
8,055,657 B2 11/2011 Lau et al.
8,250,531 B2 8/2012 Bolene et al.
8,595,090 B2 11/2013 Lau et al.
(Continued)

OTHER PUBLICATIONS

"Node-Red", retrieved from web https://web.archive.org/web/20210812101019/https://en.wikipedia.org/wiki/Node-RED, Aug. 12, 2021, 4 pages.
(Continued)

*Primary Examiner* — Maher N Algibhah
(74) *Attorney, Agent, or Firm* — Stosch Sabo

(57) ABSTRACT

A computer-implemented method for a customized interaction between networked resources and users includes obtaining a model including templated resources, and abstracting, grouping, and using the model, classifying networked resources into categories, defined by and conforming to a set of predefined ontologies. An abstract resource is instantiated using a concrete resource according to predefined criteria, the abstract resource and/or the concrete resource being an action, a condition, or data. Information is exchanged including coordination of a respective information exchange among addressable resources by an event-driven process and the networked resources are mapped using a mapping specification. A subset of concrete conditions and concrete actions is selected from a set of templated concrete conditions and templated concrete actions, according to a user profile, type of mapped networked resources, and/or user defined objectives. The selected subset of concrete actions is executed according to the respective selected subset of concrete conditions.

20 Claims, 26 Drawing Sheets

(56) References Cited

U.S. PATENT DOCUMENTS

| | | | | |
|---|---|---|---|---|
| 9,197,694 | B2 | 11/2015 | Palmeri et al. | |
| 9,213,988 | B2 | 12/2015 | Lamoureux et al. | |
| 9,467,405 | B2 | 10/2016 | Brouk et al. | |
| 9,881,255 | B1 | 1/2018 | Castellanos et al. | |
| 11,445,035 | B2 * | 9/2022 | Duggal | H04L 67/34 |
| 2004/0119738 | A1 | 6/2004 | Beringer et al. | |
| 2008/0281974 | A1 | 11/2008 | Slothouber et al. | |
| 2012/0185821 | A1 * | 7/2012 | Yaseen | G06F 8/35 717/104 |
| 2017/0078411 | A1 | 3/2017 | Hayden | |
| 2019/0052549 | A1 * | 2/2019 | Duggal | G06Q 30/0635 |
| 2019/0363996 | A1 | 11/2019 | Reese | |

OTHER PUBLICATIONS

Aslam et al. "From BPEL4WS Process Model to Full OWL-S Ontology", retrieved from web https://www.researchgate.net/publication/30385870_From_BPEL4WS_Process_Model_to_Full_OWL-S_Ontology, Jan. 2006, 4 pages.
Ghali et al. "Bringing OWL Ontologies to the Business Rules Users", Lecture Notes in Computer Science, Aug. 2012, 15 pages. https://www.researchgate.net/publication/262222938_Bringing_OWL_Ontologies_to_the_Business_Rules_Users.
Lane Kin. "Programmable Web is Shutting Down", retrieved from web https://apievangelist.com/2022/10/15/programmableweb-is-shutting-down/, Oct. 15, 2022, 3 pages.
No Author. "Semantics of Business Vocabulary and Business Rules (SBVR), v1.0", OMG Available Specification, Jan. 2008, 434 pages, https://www.omg.org/spec/SBVR/1.0/PDF.
No Author. Sparql Query Language for RDF', W3C Recommendation, Jan. 15, 2008, 51 pages.
Tran et al. "OWL-T: A Task Ontology Language for Automatic Service Composition", IEEE International Conference on Web Services (ICWS 2007), Jul. 2007, pp. 1164-1167.
Wikipedia. "OPC Unified Architecture", retrieved from web https://en.wikipedia.org/wiki/OPC_Unified_Architecture, Jul. 28, 2006, 8 pages.
Wikipedia. "RDF Schema", retrieved from web, https://en.wikipedia.org/wiki/RDF_Schema, Apr. 30, 2002, 7 pages.
Wikipedia. "Web Ontology Language", retrieved from web https://en.wikipedia.org/wiki/Web_Ontology_Language, 2009, 13 pages.
Wikipedia. "IFTTT", retrieved from web https://web.archive.org/web/20220624061128/https://en.wikipedia.org/wiki/IFTTT, Jun. 24, 2022, 4 pages.
Yu et al. "Social Modeling for Requirements Engineering", The MIT Press, 2010, 5 pages, DOI: https://doi.org/10.7551/mitpress/7549.001.0001.
OpenWeather, "Weather API," OpenWeather, 2022, 11 pages, retrieved from https://openweathermap.org/api.
Upadhyaya et al., "A Framework for Composing Personalized Web Resources," The Personal Web, Springer, 2013, pp. 65-86.
Ng, J., "The Personal Web," The Personal Web, Springer, 2013, pp. 1-10.
Chechik et al., "PWWM: A Personal Web Workflow Methodology," The Personal Web, Springer, 2013, pp. 11-48.
Ye et al., "Service Subscription and Consumption for Personal Web Applications," The Personal Web, Springer, 2013, pp. 49-64.
Dolog et al., "Design and Management ofWeb Service Transactions with Forward Recovery," Advanced Web Services, Chapter 1, 2014, pp. 3-27.
Lui et al., "A Semantic-Based Approach to Generate Abstract Services for Service Organization," Advanced Web Services, Chapter 11, 2014, pp. 253-275.
Rudzajs et al., "Service Functioning Mode in Variability Model," CAiSE 2014 Workshops, Springer International Publishing Switzerland, 2014, pp. 124-135.
Wikipedia, "Goal modeling," Wikipedia, 2021, 4 pages, retrieved from https://en.wikipedia.org/wiki/Goal_modeling.
Chatzikonstantinou et al., "Run-time requirements verification for reconfigurable systems," Information and Software Technology, vol. 75, 2016, pp. 105-121.
Chatzikonstantinou et al., "Towards a Goal Driven Task Personalization Specification Framework," IEEE Ninth World Congress on Services, 2013, pp. 180-184.
Ng, J., "The Personal Web Smart Internet for Me," Proceedings of the 2010 Conference of the Center for Advanced Studies on Collaborative Research CASCON '10, 2010, pp. 330-344, retrieved from https://dl.acm.org/doi/10.1145/1923947.1923981.
Maamar et al., "Context-based Personalization ofWeb Services Composition and Provisioning," Proceedings of the 30th EUROMICRO Conference, Jan. 2004, 9 pages.
Wen et al., "Active and Adaptive Services Resource Provisioning with Personalized Customization," 10th Web Information System and Application Conference, 2013, pp. 101-106.
Dojo, "Implementing a RESTful Service Server-Side," dojo, 2022, 15 pages, retrieved from https://dojotoolkit.org/reference-guide/1.10/quickstart/rest.html#get.
Juric, M., "A Hands-on Introduction to BPEL," Oracle Technical Article, 2022, 20 pages, retrieved from https://www.oracle.com/technical-resources/articles/matjaz-bpel.html.
Giorgini, et al., "Reasoning with Goal Models," conference paper, 2002, retrieved from http://disi.unitn.it/~pgiorgio/papers/er02.pdf on Nov. 7, 2022, 15 pages.
Lamsweerde, A., "Goal-Oriented Requirements Engineering: A Guided Tour," Proceedings RE'01, 5th IEEE International Symposium on Requirements Engineering, Aug. 2001, 14 pages.
Klusch et al., "Agent-Based Distributed Data Mining: The KDEC Scheme," Lecture Notes in Computer Science, Jan. 2003, 21 pages.
Liu et al., "SCML: A Change Management Language for Adaptive Long Term Composed Services," Advanced Web Services, 2014, pp. 225-252.

* cited by examiner

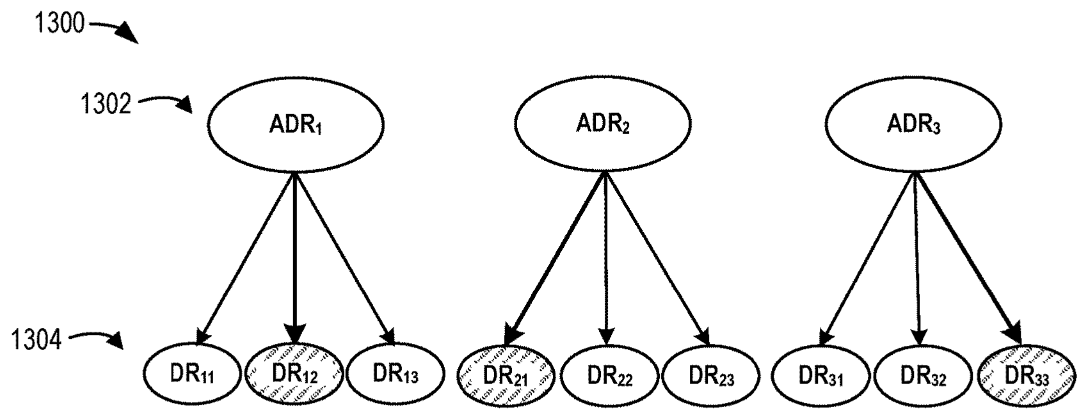
FIG. 13
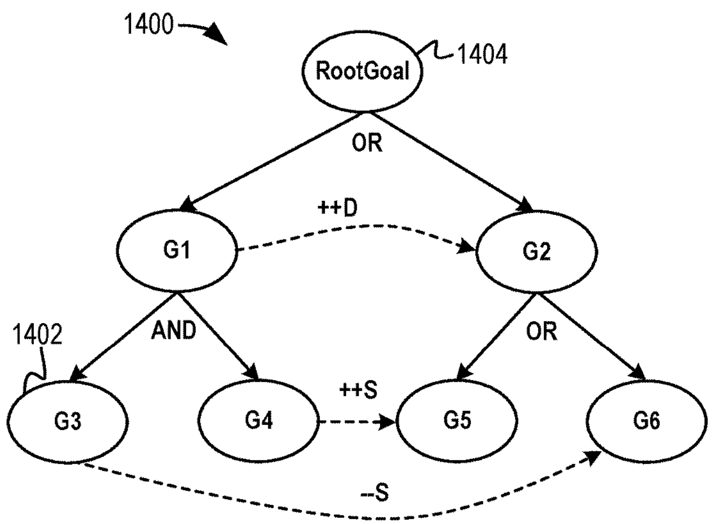
FIG. 14A
```
public class G3_Evaluator implements EvaluatorInterface {
        float  inputValue; // the  inputPlug
        Boolean  outputValue; //  the  outputPlug

    public  Boolean evaluate()  {
        if  (inputValue  <= 32)
                outputValue = true;
        else
                outputValue = false;
    return  outputValue;
    }
}
```
FIG. 14B

```
<?xml version="1.0" encoding="UTF-8"?>
<iot:Mapper xmi:version="2.0"
    xmlns:xmi="http://www.omg.org/XMI"
    xmlns:iot="http://org.eclipse.example/iot">
      <connection source="template.iot"  destination="condition.iot">
          <mapping from="Temperature" to="temp"
              fromSemanticReference="http://www.weatherdemo.com#Temperature"
              toSemanticReference="http://openweathermap.com#Temp"/>
          <mapping from="Humidity" to="humidity"
              fromSemanticReference="http://www.weatherdemo.com#Humidity"
              toSemanticReference="http://openweathermap.com#Humidity"/>
          <mapping from="AtmosphericPressure" to="pressure"
              fromSemanticReference="http://www.weatherdemo.com
                  #AtmosphericPressure"
              toSemanticReference="http://openweathermap.com#Pressure"/>
      </connection>
      <connection source="template.iot" destination="action.iot">
          <mapping from="city" to="cityName"
              fromSemanticReference="http://weatherdemo.com#City"
              toSemanticReference="http://openweathermap.com#CityName"/>
      </connection>
</iot:Mapper>
```

FIG. 17C

```xml
<?xml version="1.0" encoding="UTF-8"?>
<iot:AbstractDomainResource xmi:version="2.0"
  xmlns:xmi="http://www.omg.org/XMI"
  xmlns:xsi="http://www.w3.org/2001/XMLSchema-instance"
  xmlns:iot="http://org.eclipse.example/iot"
  repositoryReference="repository/resourceRepository.ttl"
  semanticReference="otology/weatherdemo.ttl"
  label="current weather information" domain="Weather">
  <resourceMetaModel>
    <serialization xsi:type="iot:StringTemplateSerialization"/>

  </resourceMetalModel>
  <ActionInterface xsi:type="iot:Read" label="Find out weather information">
    <output>
      <outputMetaModel>
        <outputPlug key="Temperature"/>
        <outputPlug key="Humidity"/>
        <outputPlug key="AtmosphericPressure"/>
      </outputMetaModel>
    </output>
    <inputPlug key="city" label="Name of a city" type="string"/>
  </ActionInterface>
</iot:AbstractDomainResource>
```

FIG. 18A

```
<?xml version="1.0" encoding="UTF-8"?>
<iot:DomainResource xmi:version="2.0"
  xmlns:xmi="http://www.omg.org/XMI"
  xmlns:xsi="http://www.w3.org/2001/XMLSchema-instance"
  xmlns:iot="http://org.eclipse.example/iot"
  repositoryReference="repository/resourceRepository.ttl"
  semanticReference="otology/openweathermap.ttl"
  label="current weather information" domain="Weather"
  host="api.openweathermap.org"
  urlReference="http://api.openweathermap.org/data/2.5/weather?q=${city}">
  <resourceMetaModel>
    <serialization xsi:type="iot:StringTemplateSerialization"/>
  </resourceMetalModel>
  <ActionInterface xsi:type="iot:Read" label="Find out weather information">
    <output>
      <outputMetaModel>
        <outputPlug key="temp" label="Temperature in Fahrenheit"
          plugPath="$.main.temp"
          semanticReference="http://www.openweathermap.com#Temp"/>
        <outputPlug key="humidity" label="Humidity in percentage"
          plugPath=$.main.humidity"
          semanticReference="http://www.openweathermap.com#Humidity"/>
        <outputPlug key="pressure" label="AtmosphericPressure in hPa"
          plugPath=$.main.pressure"
          semanticReference="http://www.openweathermap.com#Pressure"/>
      </outputMetaModel>
    </output>
    <inputPlug key="city" label="Name of a city" type="string"/>
  </ActionInterface>
</iot:DomainResource>
```

FIG. 18B

```
<?xml version=”1.0" encoding=”UTF-8"?>
<iot:Condition xmi:version=”2.0"
  xmlns:xmi=”http://www.omg.org/XMI”
  xmlns:iot=”http://org.eclipse.example/iot”
  conditionGoalModel=”instances/condition.goal” resultType=”Fuzzy”>
    <inputConditionPlugKeys key=”temp”
      semanticReference=”http://www.openweathermap.com#Temp”/>
    <inputconditionPlugKeys key=”humidity”
      semanticReference=”http://www.openweathermap.com#Humidity”/>
    <inputconditionPlugKeys key=”pressure”
      semanticReference=”http://www.openweathermap.com#Pressure”/>
  </iot:Condition>
```

FIG. 19A

```
<?xml version=”1.0" encoding=”UTF-8"?>
<goal:GoalModel xmi:version=”2.0"
  xmlns:xmi=”http://www.omg.org/XMI”
  xmlns:xsi=”http://www.w3.org/2001/XMLSchema-instance”
  xmlns:goal=”http://org.eclipse.example/goal”
    <root xsi:type=”goal:CompositeGoalNode” name=”WinterTime”>
      <hasDecomposition>
        <decomposedTo xsi=type=”goal:CompositeGoalNode”
            name=”LowHumidityOrHighPressure”>
          <hasDecomposition decomType=”OR”>
          <decomposedTo xsi:type=goal:AtomicGoalNode”
              name=”HighPressure” conditionPlugKey=”pressure”/>
          <decomposedTo xsi:type=”goal:AtomicgoalNode” name=”LowHumidity”
              conditionPlugKey=”humidity”/>
        </hasDecomposition>
      </decomposedTo>
      <decomposedTo xsi:type=”goal:AtomicGoalNode” name=”LowTemperature”
        conditionPlugKey=”temp”/>
    </hasDecomposition>
  </root>
</goal:GoalModel>
```

FIG. 19B

```
<?xml version="1.0" encoding="UTF-8"?>
<iot:Action xmi:version="2.0"
  xmlns:xmi="http://www.omg.org/XMI"
  xmlns:iot="http://org.eclipse.example/iot"
  actionBPELModel="instances/action.bpel" triggerInput="Fuzzy">
    <inputActionPlugKeys key="cityName"
      semanticsReference="http://www.openweathermap.com#CityName"/>
</iot:Action>
```

FIG. 20

```
<?xml version="1.0" encoding="UTF-8"?>
<process name="BusinessActionProcess"
          targetNamespace="http://org.eclipse.example/bpel/action/"
          xmlns="http://schemas.xmlsoap.org/ws/2003/03/business-process/"
          xmlns:bpws="http://schemas.xmlsoap.org/ws/2003/03/business-process/"
          xmlns:act="http://org.eclipse.example/bpel/action/"
          xmlns:sms="http://org.eclipse.example/service/sms/">
    <partnerLinks>
      <partnerLink name="client" partnerLinkType="act:actionLT"
        myRole="actionClient" partnerRole="conditionClient"/
      <partnerLink name="TwilioSMS" partnerLinkType="sms:messageLT"
        myRole="messageCustomer" partnerRole="messageService"/
    </partnerLinks>
    <variables>
      <variable name="ActionRequest" messageType="act:ActionRequestMessage"/>
      <variable name="NotificationDetails"
        messageType=sms:NotificationRequestMessage"/>
    </variables>
    <sequence>
      <receive partnerLink="client" portType="sms:ActionExecutionPT"
        operation="ActionExecution" variable="ActionRequest"
        createInstance="yes" />
      <invoke partnerLink=TwilioSMS" portType="sms:MessageServicePT
        operation="MessageService" inputVariable="NotificationDetails"
        outputVariable="Notificationresponse" />
      <invoke partnerLink="client" portType="act:ClientCallbackPT"
        operation="ClientCallback" inputVariable="NotificationREsponse" />
    </sequence>
  </process>
```

FIG. 21

CUSTOMIZED INTERACTION BETWEEN NETWORKED RESOURCES AND USERS

BACKGROUND

The present invention relates to interactions between networked resources and users, and more specifically, this invention relates to a customized interaction between networked resources and users using controlled conditions and actions.

Service computing has emerged as a major paradigm for clients to access remote services. Such services can be invoked either through well-defined message-oriented interfaces (e.g., classic message-oriented Web services), or through uniform resource identifiers as addressable resources (as it is the case for RESTful Web services). In either case, services are accessed through well-defined endpoints. In this context, a major problem for application developers and end users is to: a) choose the right endpoint (i.e., services) from many external ones and; b) assemble compositions of services in order to create customizable and context-aware workflows. For instance, there are already over one thousand APIs under the Mapping category on ProgrammableWeb. In addition, there are more resources available in Internet of Things (IoT) domain, such as sensors, actuators, processors, etc. On the other hand, developers may not be familiar with the details of service interfaces that these resources provide, which may include the details of the semantics of the exposed APIs, the semantics of the response data, etc. Furthermore, most service composition and service workflow languages do not provide means for customization based on context and/or user requirements.

Such a service selection and service composition framework, whereby services are considered any type of networked resource, provides the foundation for a novel IoT programming model. To date, there is a lack of high level programming model for extended IoT applications. Limited functionality in this area is provided by the If This Then That (IFTTT) and the NodeRed frameworks.

Thus, customizable and context-aware interactions between the non-trivial work provided by IoT devices (i.e., networked service offering resources) and individual users has remained elusive.

SUMMARY

In one embodiment, a computer-implemented method for a customized interaction between networked resources and users includes obtaining a model comprising templated resources, and abstracting, grouping, and classifying networked resources into categories using the model. The categories being defined by and conforming to a set of predefined ontologies. An abstract resource is instantiated using a concrete resource according to predefined criteria, where the abstract resource and/or the concrete resource is an action, a condition, or data. Information is exchanged including coordination of a respective information exchange among addressable resources by an event-driven process and the networked resources are mapped using a mapping specification including a predefined static specification and/or a dynamic specification. A subset of concrete conditions and concrete actions is selected from a set of templated concrete conditions and templated concrete actions, according to a user profile, type of mapped networked resources, and/or user defined objectives. The selected subset of concrete actions is executed according to the respective selected subset of concrete conditions.

In another embodiment, a computer-implemented method for running a customized interaction between networked resources and a user includes receiving an event and generating a request based on the event. The request is configured to cause collection of a response object according to a templated model comprising templated resources. The method includes executing an exchange with a source providing response data according to the request, where the response data is configured to instantiate abstract resources with concrete resources according to predefined criteria. A second request is generated in response to a determination that additional data is needed for a response to the event; and the response object is evaluated utilizing a condition goal model in response to a determination that additional data is not needed. A third request is generated according to a condition result of the evaluation that includes a determination that additional data is needed; and an action is generated according to a condition result of the evaluation that includes a determination that no additional data is needed. The action is evaluated utilizing a task goal model, and the action is executed according to a result of the evaluation of the task goal model.

In another embodiment, a system for a customized interaction between networked resources and a user includes a modeling sub-system, an instantiation sub-system, and a runtime sub-system. The modeling sub-system includes a templated resource modeling module configured to read a specification of abstract resources and generate a templated resource model, where the templated resource model includes networked resources that are classified into categories defined by and conforming to a set of predefined ontologies, where the networked resources comprise an abstract condition resource, an abstract data resource, and an abstract action resource. The instantiation sub-system includes a resource instantiation module for instantiating each of the abstract resources with a concrete resource, the resource instantiation module includes a domain ontology and a resource repository. The resource repository is accessible to allow retrieval of a resource for instantiating the abstract resource using a concrete resource according to a context and/or preferences defined by a user. At least one abstract resource is instantiated according to a set of templated concrete conditions and concrete actions.

The run-time sub-system is configured to perform a task in response to an event. The run-time system is configured to receive the event and generate a request based on the event, where the request is configured to cause collection of a response object according to the templated resource model. An exchange is executed with a source providing response data according to the request, where the response data is configured to instantiate abstract resources with concrete resources according to a predefined criterion. A second request is generated in response to a determination that additional data is needed for a response to the event; and the networked resources are evaluated utilizing a condition goal model in response to determining that no additional data is needed. A third request is generated according to a condition result of the evaluation that includes a determination that additional data is needed; and an action is generated according to a condition result of the evaluation that includes a determination that no additional data is needed. The action is evaluated utilizing a task goal model, and the action is executed according to a result of the evaluation of the task goal model.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 13 is an example instantiation of three abstract resources with three concrete resources, in accordance with one embodiment of the present invention.

FIG. 14A is an example of a goal model, in accordance with one embodiment of the present invention.

FIG. 14B is an example Evaluator attached to a node, in accordance with one embodiment of the present invention.

FIG. 17C is an Example Mapper in XML which links the Resource template.iot with the condition condition.iot and the action action.iot, in accordance with one embodiment of the present invention.

FIG. 18A is an Abstract Resource model defined in file template.iot, in accordance with one embodiment of the present invention.

FIG. 18B is an Instantiated Resource model by resource api.openweathermap.org, in accordance with one embodiment of the present invention.

FIG. 19A is an example of a reference to a Condition Resource defined in file condition.iot and which references the goal model in file condition.goal, in accordance with one embodiment of the present invention.

FIG. 19B is an example of a goal model defined in file condition.goal with label "WinterTime," in accordance with one embodiment of the present invention.

FIG. 20 is an Action Resource action.iot referencing the file action.bpel, in accordance with one embodiment of the present invention.

FIG. 21 is a BPEL Model defined in file action.bpel with the label "BusinessActionProcess," in accordance with one embodiment of the present invention.

DETAILED DESCRIPTION

Figure 1:
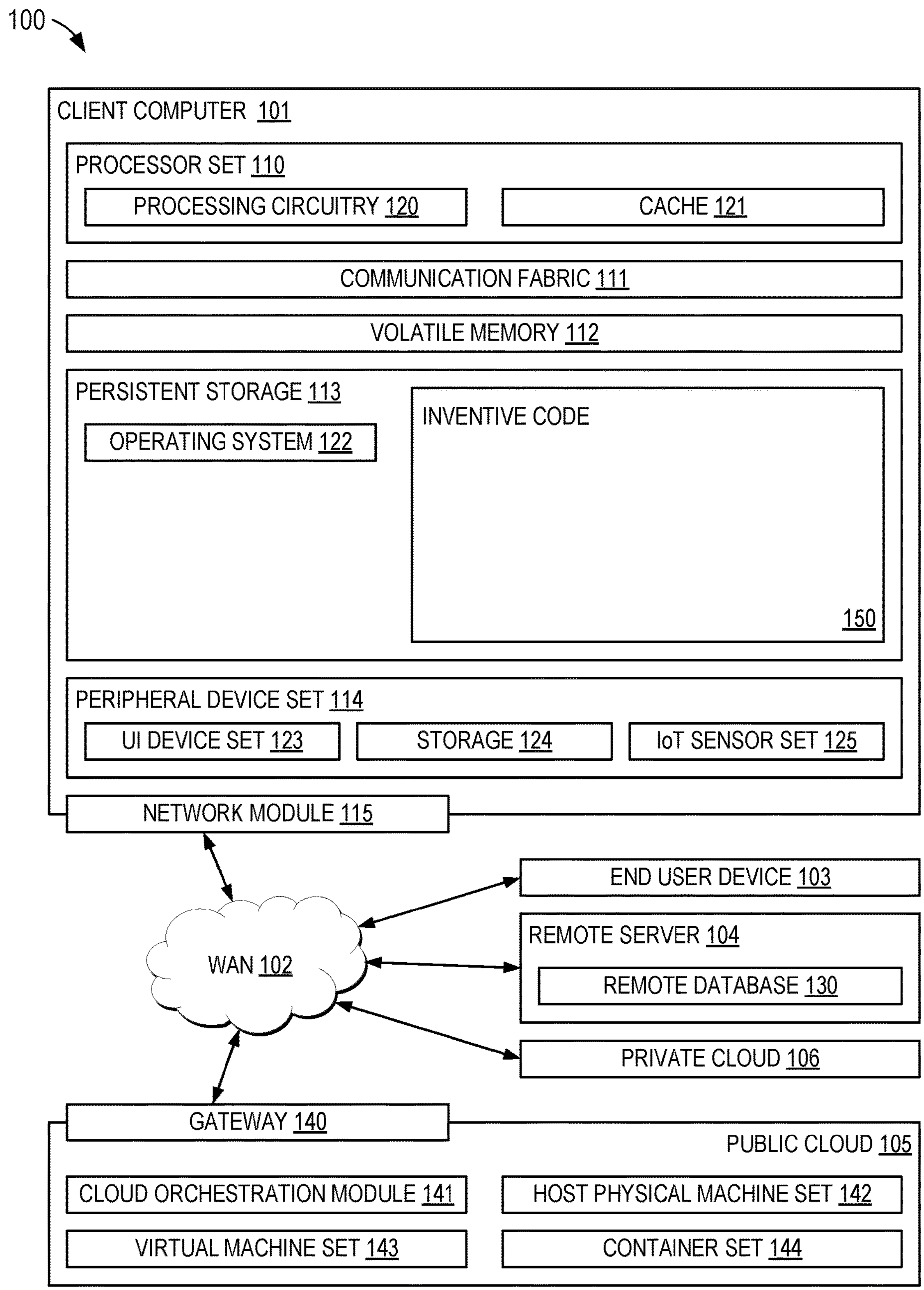
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for a customized interaction between networked resources and users.

In one general embodiment, a computer-implemented method for a customized interaction between networked resources and users includes obtaining a model comprising templated resources, and abstracting, grouping, and classifying networked resources into categories using the model. The categories being defined by and conforming to a set of predefined ontologies. An abstract resource is instantiated using a concrete resource according to predefined criteria, where the abstract resource and/or the concrete resource is an action, a condition, or data. Information is exchanged including coordination of a respective information exchange among addressable resources by an event-driven process and the networked resources are mapped using a mapping specification including a predefined static specification and/or a dynamic specification. A subset of concrete conditions and concrete actions is selected from a set of templated concrete conditions and templated concrete actions, according to a user profile, type of mapped networked resources, and/or user defined objectives. The selected subset of concrete actions is executed according to the respective selected subset of concrete conditions.

In another general embodiment, a computer-implemented method for running a customized interaction between networked resources and a user includes receiving an event and generating a request based on the event. The request is configured to cause collection of a response object according to a templated model comprising templated resources. The method includes executing an exchange with a source providing response data according to the request, where the response data is configured to instantiate abstract resources with concrete resources according to predefined criteria. A second request is generated in response to a determination that additional data is needed for a response to the event; and the response object is evaluated utilizing a condition goal model in response to a determination that additional data is not needed. A third request is generated according to a condition result of the evaluation that includes a determination that additional data is needed; and an action is generated according to a condition result of the evaluation that includes a determination that no additional data is needed. The action is evaluated utilizing a task goal model, and the action is executed according to a result of the evaluation of the task goal model.

In another general embodiment, a system for a customized interaction between networked resources and a user includes a modeling sub-system, an instantiation sub-system, and a runtime sub-system. The modeling sub-system includes a templated resource modeling module configured to read a specification of abstract resources and generate a templated resource model, where the templated resource model includes networked resources that are classified into categories defined by and conforming to a set of predefined ontologies, where the networked resources comprise an abstract condition resource, an abstract data resource, and an abstract action resource. The instantiation sub-system includes a resource instantiation module for instantiating each of the abstract resources with a concrete resource, the resource instantiation module includes a domain ontology and a resource repository. The resource repository is accessible to allow retrieval of a resource for instantiating the abstract resource using a concrete resource according to a context and/or preferences defined by a user. At least one abstract resource is instantiated according to a set of templated concrete conditions and concrete actions.

The run-time sub-system is configured to perform a task in response to an event. The run-time system is configured to receive the event and generate a request based on the event, where the request is configured to cause collection of a response object according to the templated resource model. An exchange is executed with a source providing response data according to the request, where the response data is configured to instantiate abstract resources with concrete resources according to a predefined criterion. A second request is generated in response to a determination that additional data is needed for a response to the event; and the networked resources are evaluated utilizing a condition goal model in response to determining that no additional data is needed. A third request is generated according to a condition result of the evaluation that includes a determination that additional data is needed; and an action is generated according to a condition result of the evaluation that includes a determination that no additional data is needed. The action is evaluated utilizing a task goal model, and the action is executed according to a result of the evaluation of the task goal model.

A list of acronyms used in the description is provided below.

ASIC application specific integrated circuit
BPEL business process execution language
CD-ROM compact disc read-only memory
CPP computer program product
CPU central processing unit
DVD digital versatile disk
EPROM erasable programmable read-only memory
EUD end user device
FPGA field programmable gate array
GPU graphics processing unit
HDD hard disk drives
IC integrated circuit
IFTTT If This Then That
I/O input/output
IoT Internet of Things
LAN local area network
NFC Near-Field Communication
NVM nonvolatile memory
OWL Web Ontology Language
QoS quality of service
RAM random access memory
RAMM Resource Abstraction Meta-model
RDF Resource Description Framework
REST Representational State Transfer
ROM read-only memory
SAN storage area network
SD secure digital
SDN software-defined networking
SRAM static random access memory
SSD solid state drive
UI user interface
URI uniform resource identifier
USB universal serial bus
VCE virtual computing environment
WAN wide area network
XML extensible markup language Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as code 150 for a customized interaction between networked resources and users. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
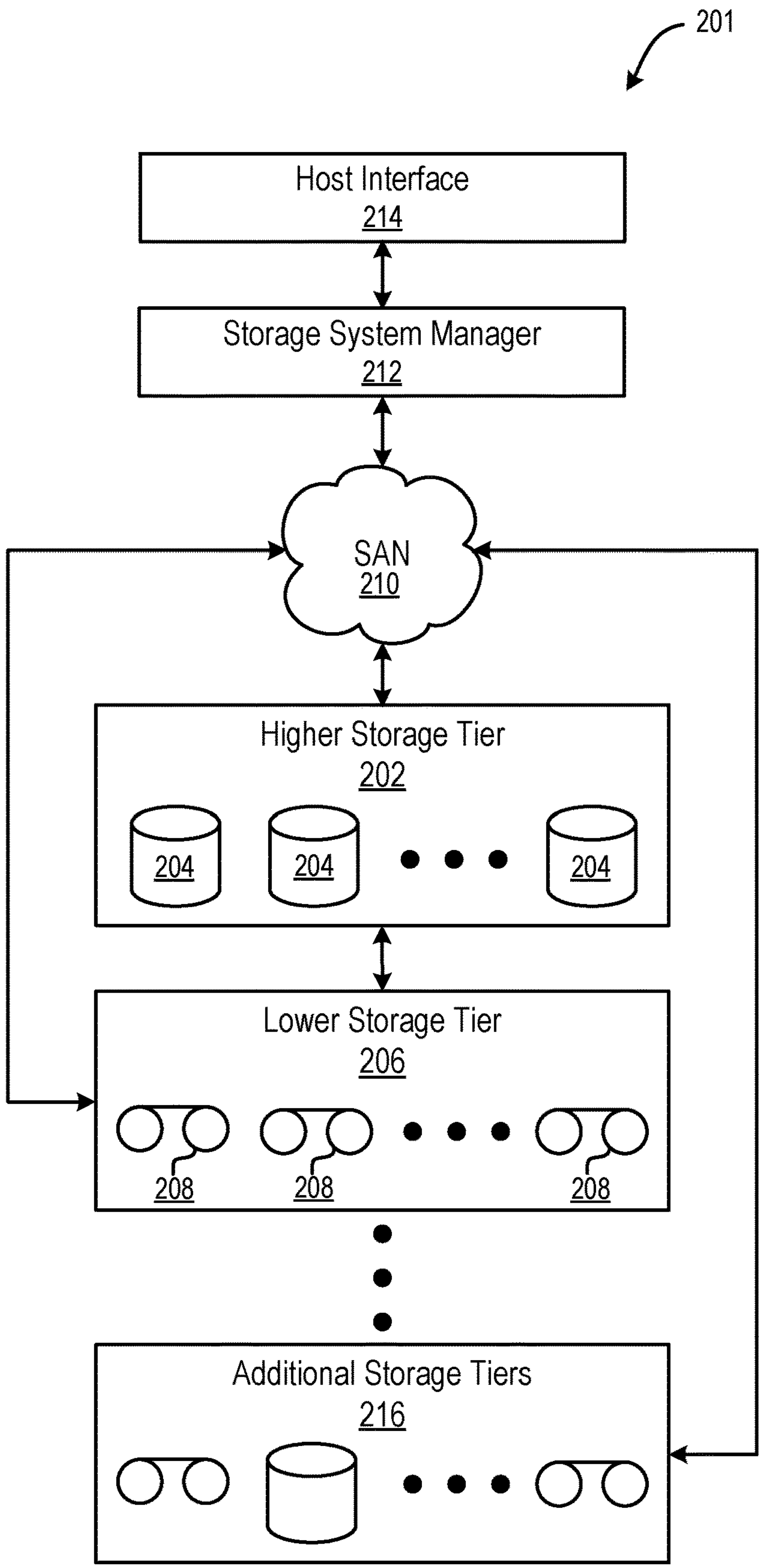
FIG. 2 is a diagram of a tiered data storage system, in accordance with one embodiment of the present invention.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

The IoT combined with agent-based computing emerges as a next-generation system paradigm such that IoT devices are not merely considered as sensors but as components (i.e., agent resources) that can offer specific and highly granular functionality (i.e., microservices type).

The main objective of the work presented in this disclosure is to achieve an environment whereby internetworked resources (i.e., service provisioning components, networked IoT devices) and users can intelligently and in a customizable way communicate and interact with each other and invoke, as needed, other microservices or internetworked resources over the Internet. Such an enhanced, next-generation resource-oriented environment, introduces significant opportunities for novel applications in many different domains such as retail, banking, transportation, logistics, Industry 4.0 applications, etc.

Figure 3:
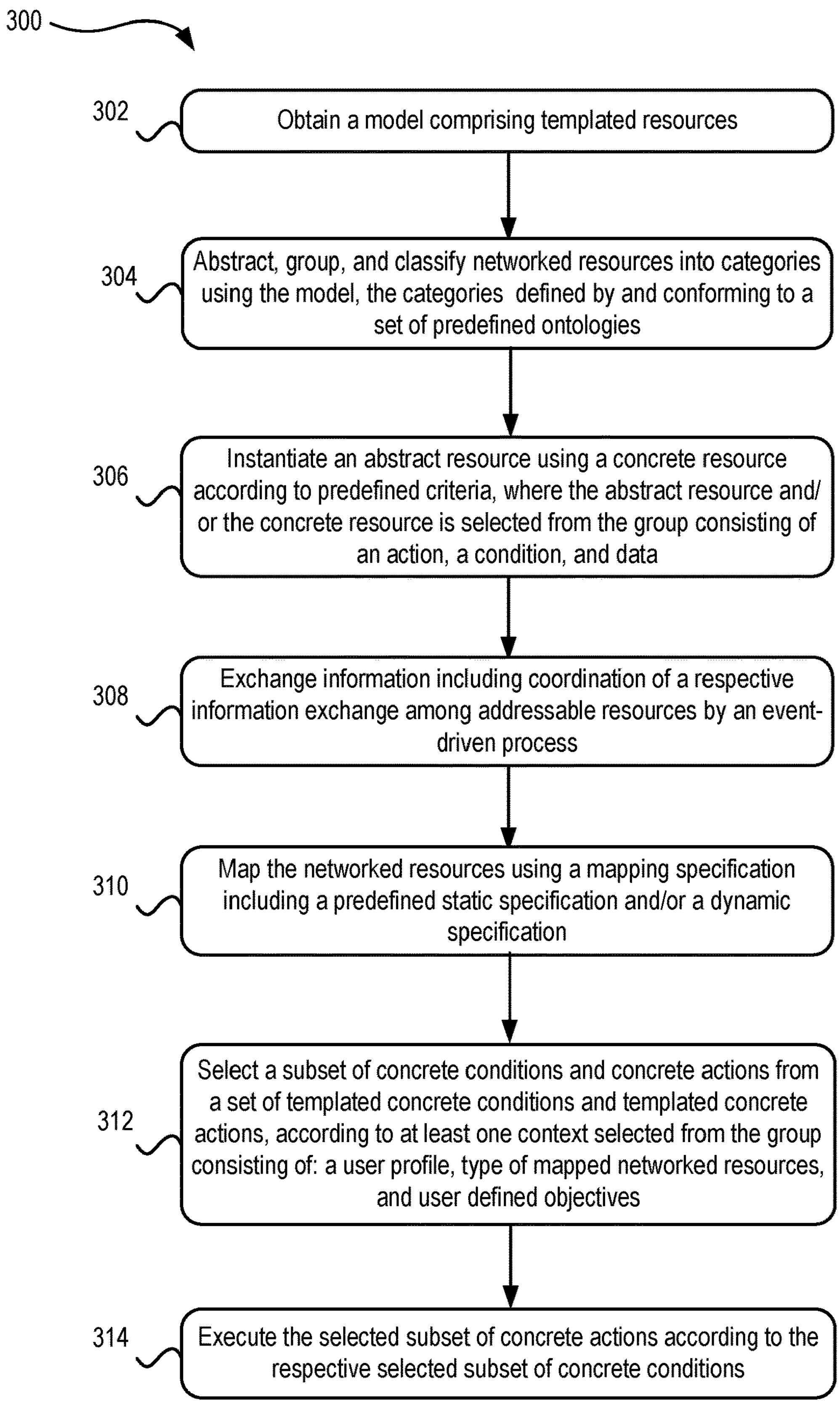
FIG. 3 is a flowchart of a method for a customized interaction between networked resources and users, in accordance with one embodiment of the present invention.

Now referring to FIG. 3, a flowchart of a method 300 for a customized interaction between networked resources and users is shown according to one embodiment. The method 300 may be performed in accordance with the present invention in any of the environments depicted in FIGS. 1-21, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, a handheld device, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a model comprising templated resources is obtained (e.g., created, received, etc.). Operation 304 includes using the model for abstracting, grouping, and classifying networked resources into categories, the categories defined by and conforming to a set of predefined ontologies. The model may be built according to specifications of a client. The client may be a user, a program, etc. The model may describe how networked resources may be assembled in order to perform a task.

Operation 306 includes instantiating an abstract resource with a concrete resource according to predefined criteria. The predefined criteria for instantiating an abstract resource with a concrete resource depends on the context of the client (e.g., user) and/or the state of the service, the overall operational context (e.g., the jurisdiction the service is located), etc. The context may include a location of the client, a location of the resource, a time of year, etc. In one approach, the context may be a personal context to the client. In another approach, the context may be a user-defined scenario. In one approach, a client may define a task with abstract resources that may be instantiated with actual resources (e.g., concrete resources, specific resources, etc.) to yield a task model comprised of actual resources.

Resources such as an abstract resource, a concrete resource, a networked resource, a resource object, etc. may be an action, a condition, data, information, etc. In particular, resources may be linked, addressable, labeled, etc. over a network with a unique identifier. For example, over the internet, a unique identifier may be a URL. Moreover, resources may be data, programs, information, etc. that have value to a user, and may be accessed via a unique identifier.

Operation 308 includes exchanging information including coordination of a respective information exchange among addressable resources by an event-driven process. In various approaches, the event-driven process may be initiated by a client.

Operation 310 includes mapping the networked resources using a mapping specification including a predefined static specification and/or a dynamic specification. For example, a specification, either predefined static or dynamic may form a user scenario plan.

Operation 312 includes selecting a subset of concrete conditions and concrete actions from a set of templated concrete conditions and templated concrete actions. The selection of a subset of concrete conditions and concrete actions may be according to at least one of the following contexts: a user profile, type of mapped networked resources involved in a user (e.g., client) scenario plan enacted, user defined objectives, etc.

Operation 314 includes executing the selected subset of concrete actions according to the respective selected subset of concrete conditions.

One embodiment is related to a method and system whereby any internet addressable resource such as a service, a device, a data source, etc. may be connected with any other resource utilizing a mapper model, and consequently coordinate the exchange of data, invocation of services, etc. using a condition model and an action model. The condition and action models can be customized per user and allow for personalized resource interaction scenarios to be enacted on a global internet scale. The concept of a user does not necessarily imply a human user, and includes any client application which can issue requests. The invention does not place restrictions on which resources can be accessed. Instead, it allows for generic categories of resources to be specified (e.g., may be referred to as "abstract resources"), while a selection process identifies the optimal actual Internet addressable resources (may be referred below as "instantiated," "concrete resources," etc.) to be used for each user, on each given interaction scenario.

In one approach, a system may be based on "resources" that can be discovered, interact, and coordinate according to specific logic and constraints in order to achieve a task (e.g., a goal) on behalf of its users. In this context, the user writes a new abstract task (e.g., generic, templated, etc. task) which involves the use of wiring data and services having different internetworked resource types (i.e., resource categories) which act as producers or consumers according to their role in the specific interaction task scenario. Alternatively, the user selects an abstract task from a predefined list of abstract tasks. An example of a task is presented in Example 1 which describes an abstract template of an abstract user-resource interaction task scenario:

Example 1

When I am in the shopping mall ?k and there is a clothes store offering ?p with a discount of more than ?x % but for a price not exceeding ?y$, and it is at the end of the month, and my savings account has a balance more than ?z$, notify me, and initiate a comparison of ?p prices with similar clothes' brands list ?w.

The task of Example 1 includes an abstract discount, an abstract price, an abstract bank account, etc. The task may be instantiated with concrete resources such as: the shopping mall, the bank account, etc. that will enable the task to be performed if initiated, as shown in Example 2.

Example 2 is a "concrete" scenario being instantiated by the abstract template of Example 1, and is described as follows:

Example 2

When I am in the shopping mall <Fairview mall> and there is a clothes store offering <jeans> with a discount of more than <30%> but for a price not exceeding <40$>, and it is at the end of the month, and my savings account has a balance more than <2000$>, notify me, and initiate a comparison of <jeans> prices with similar clothes brands <[StoreA, StoreB, StoreC]>.

As an example, in such a system the interactions among resources over http verbs (GET, POST, etc.), other protocols, etc. may be asynchronous and not necessarily sequential. Different pieces of data may emanate asynchronously from different resources (e.g., /vendor/StoreA/, /vendor/StoreB, /StoreA/products/jeans/style/straightcut/discount/, etc. as a result of GET requests in the case of a Representational State Transfer (REST) RESTful implementation), instantiating a user scenario such as the one above, allowing thus for ad-hoc interactions among resources given the availability of data and without need to follow a predefined process (e.g., a business process execution language (BPEL) process), plan, etc.

In this context, a reference architecture is needed as well as a programming model for denoting the logic by which "abstract" resources form templates of interactions. In addition, a reference architecture/programming model is needed for denoting domain (e.g., condition) logic that may be applied to govern, guard, etc. the interactions among the resource agents. In Examples 1 and 2 above, such logic could be a comparator of values, a location finding service, etc. An architecture and programming model may facilitate the customizability and programmability of the system. The system allows developers to implement intelligent (e.g., agent-based) applications without needing to consider low level programming infrastructure (e.g., device service, raw data format, communication protocol, etc.). One embodiment provides a client-side programming model for such extended IoT applications. Moreover, extended functionality in this area can be provided by third party components such as the IFTTT and the NodeRed frameworks.

Figure 4:
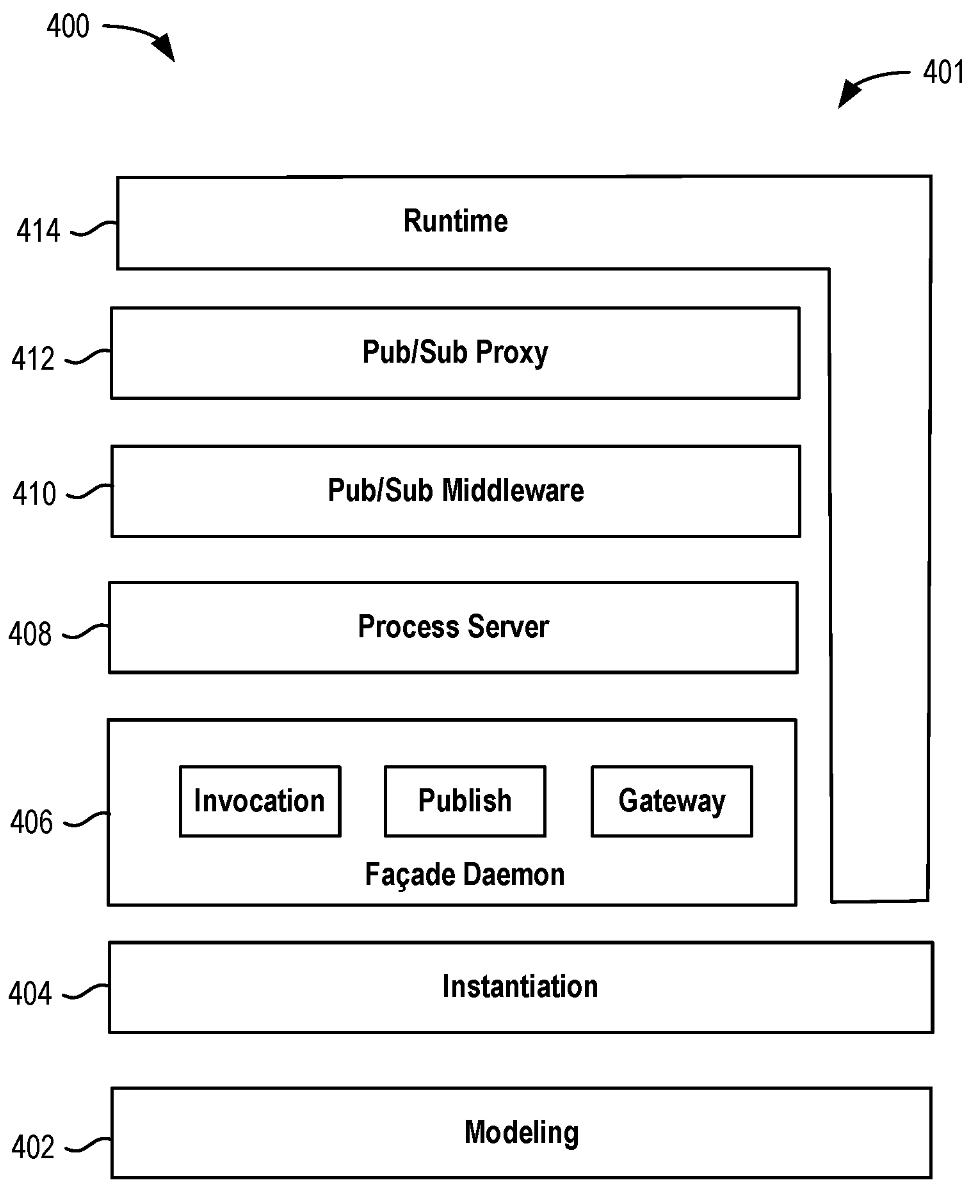
FIG. 4 is a diagram of a system architecture, in accordance with one embodiment of the present invention.

FIG. 4 depicts a system 400 for customized interaction between networked resources and users, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

As described herein, in addition to the design choices under consideration for operating and deploying such a system, important non-functional options such as scalability, robustness, security, and fault tolerance are considered. Since such applications usually involve many devices or services, which are distributed across different regions, the proposed architecture must be able to handle large volumes of data and events efficiently.

According to one embodiment, the system 400 may be an event-driven architecture based on the publish-subscribe paradigm and enables the interaction between entities (resources, conditions, actions).

An overview of the an architecture 401 of the system 400, given a collection of instantiated concrete resources, service end points, etc. established during modeling 402 and instantiation 404, a runtime model 414 may be imposed that follows a) the composition of a model 402 (as specified in the Mapper) and b) an implicit invocation paradigm such as the Event-Condition-Action programming paradigm (i.e., if certain events occur, and certain conditions hold, certain actions are invoked), which is driven by a publish-subscribe infrastructure (e.g., the OPC-UA Pub/Sub framework), as illustrated in layers 406, 408, 410, and 412.

According to one embodiment, a system is based a) on a layered and event-driven architecture 401 that utilizes the publish/subscribe paradigm 410, 412 for data exchange, and b) on the implicit invocation paradigm for the evaluation of conditions and the invocation of actions, layers 402, 404, 406 and 408.

In one approach, the architecture 400 may be structured across seven layers, 402, 404, 406, 408, 410, 412, and 414, as depicted in FIG. 4. Each layer builds upon the functionality provided by the layer below and exposes interfaces to the layer above. For example, the instantiation 404 layer builds on the functionality provided by the modeling 402 layer and, in turn, exposes interfaces to the Facade Daemon layer 406 above. In addition, layers are independent of each other. Each layer has its own implementation and may be replaced by a different implementation if necessary.

The Modeling 402 layer hosts all the components for a user to draft and edit models related to abstract domain resources, models related to conditions, actions and the composition of the above entities. The instantiation 404 layer hosts components that instantiate abstract domain resource models to concrete ones. The layers 406, 408, 410, 412 above serve the runtime system 414, which employs an event-driven architecture 400. Specifically, it uses the publish/subscribe model 412 to process events in the middleware 410. Different components (e.g., Façade Daemon 406, Process Server 408) subscribe to event channels and get notified when a new event is posted. When the condition is satisfied, the system executes corresponding actions as specified by the action models.

Implementation of the system is provided in three parts. A first part represents the overall system architecture as shown in the schematic diagram in FIGS. 5A-5B.

Figure 5A:
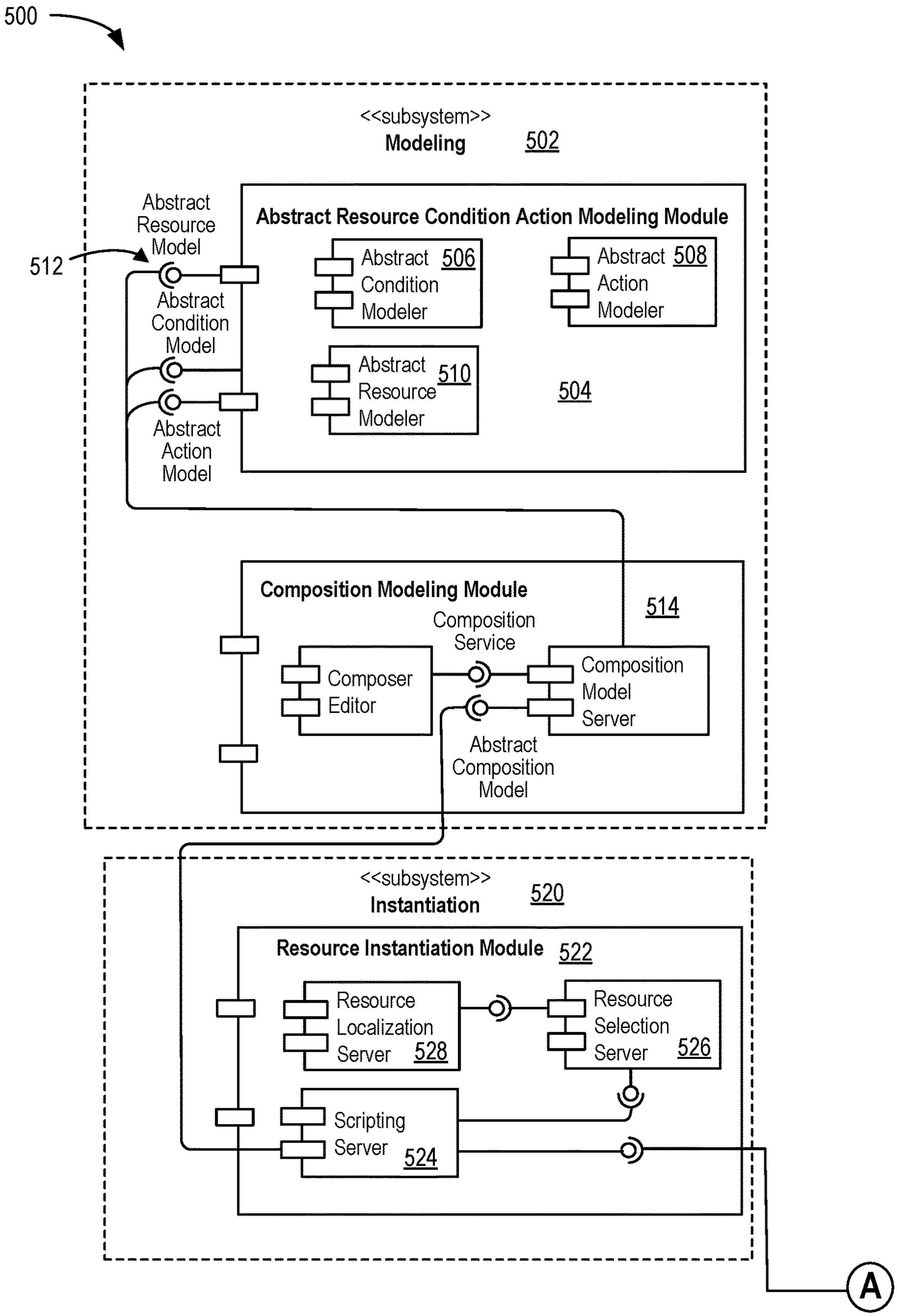
FIGS. 5A-5B is a representative diagram of the system's Component Diagram, in accordance with one embodiment of the present invention.
Figure 5B:
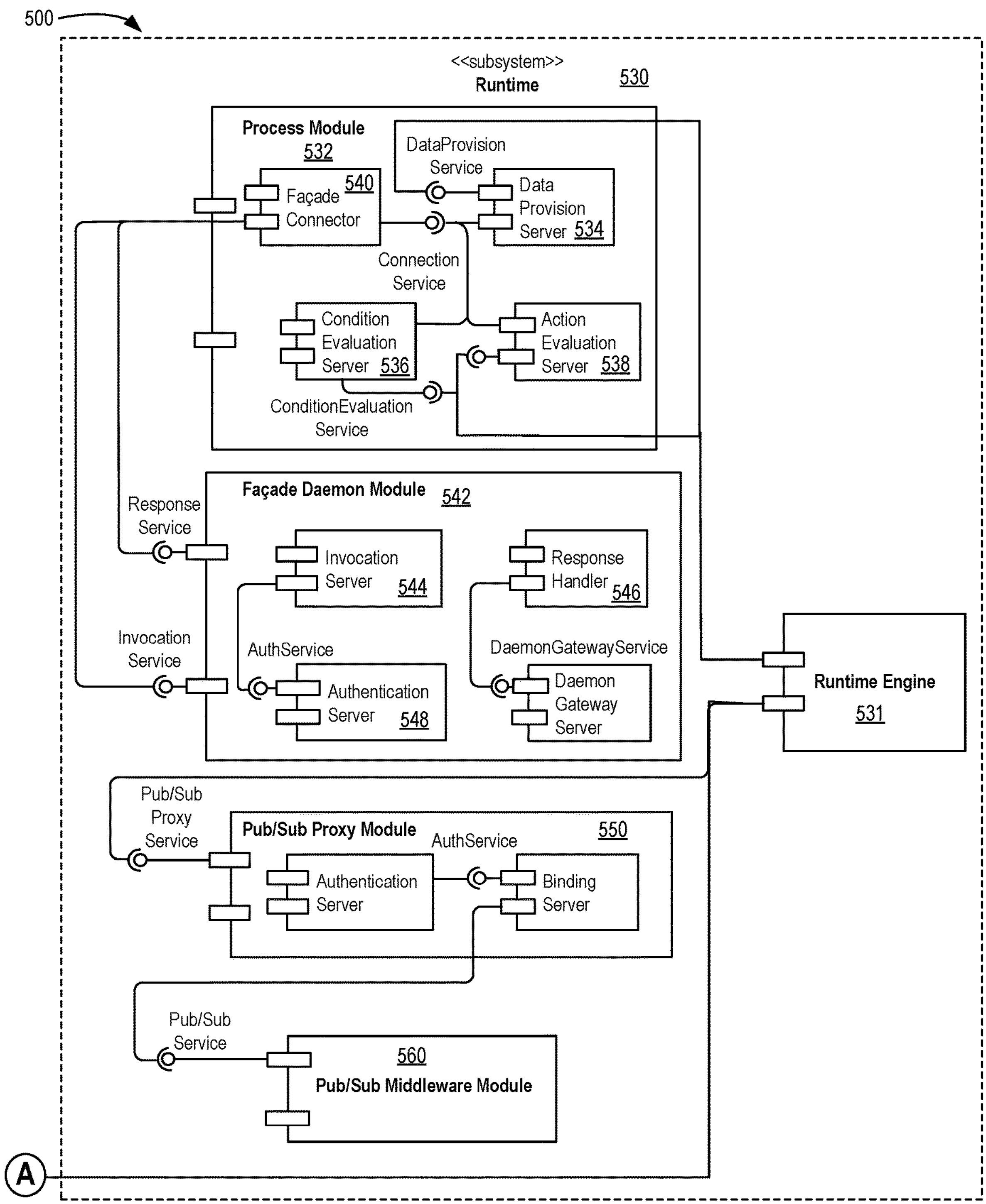

FIGS. 5A-5B depict a component diagram of the proposed architecture of the system. The architecture is comprised of modules, and each component of a respective module is described in Tables 1-2. In one embodiment and implementation of the architecture, during runtime, the OPC-UA server is the first initialized and each address space is registered in the server. Other open source or proprietary publish/subscribe frameworks such as MQTT can also be used in lieu of OPC-UA server.

Role of Pub/Sub OPC-UA Middleware

The run-time engine of the implemented system is registering each inputPlug and each outputPlug of any entity (resource, condition, action) with the OPC-UA Publish/Subscribe framework so that the run-time environment can make use of values available to the resources that need them, and evaluate the appropriate condition resources, e.g., information to be exchanged between the networked resources. The run-time system utilizes the Mapper to make these pub/sub requests. For the use of the middleware, please see the Activity Diagram in FIG. 7.

Figure 16:
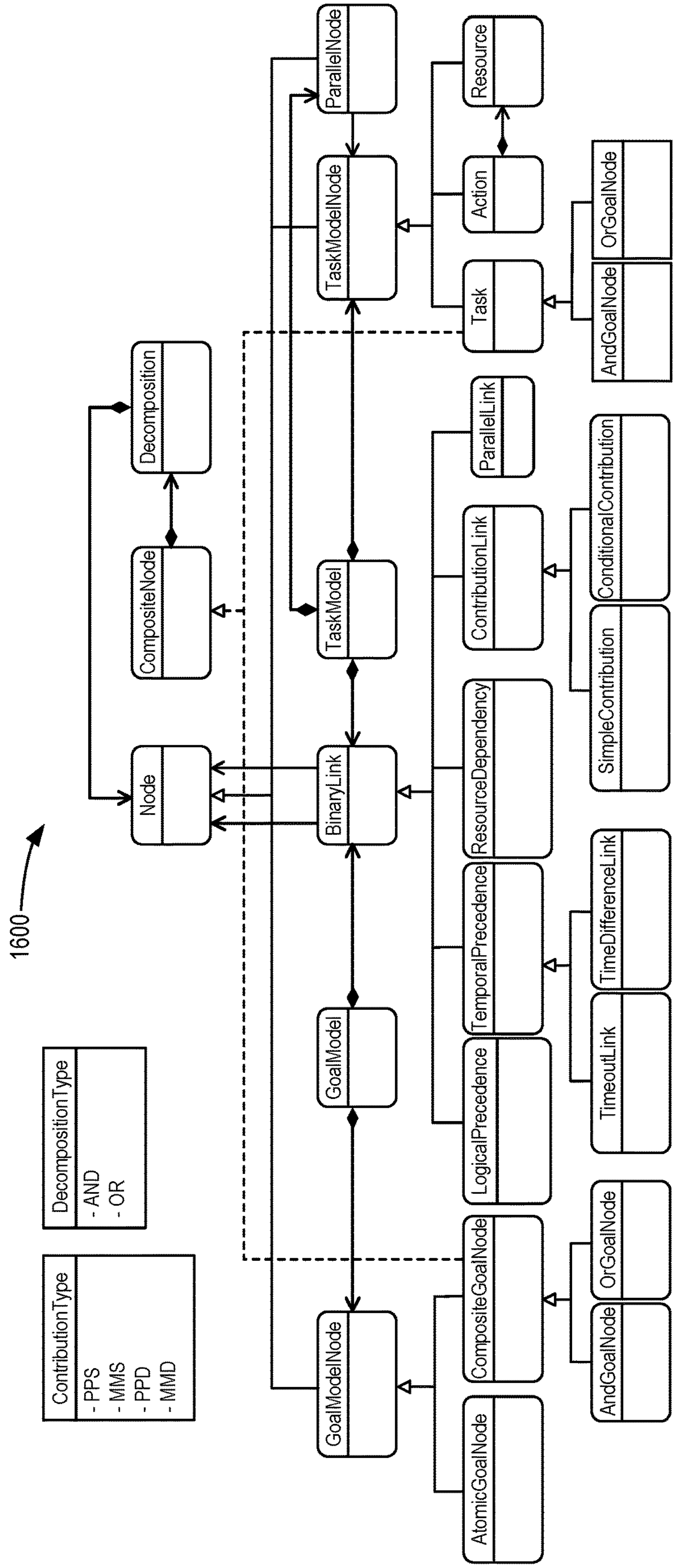
FIG. 16 is a diagram of a Goal and Action Model Meta model, in accordance with one embodiment of the present invention.

The proposed system is not bound to Action Models illustrated in this description (e.g., FIG. 16). These action models are presented here only for prototyping. An action model can be any other service choreography model. Once an action is performed its result data are posted on the OPC-UA server, so if there is a resource that has registered its inputPlug for this data then it will obtain this data. If this resource is connected via a Mapper to a Condition, then the Condition will be evaluated (see Evaluator class example in FIG. 14B), and if true, then the corresponding Action resource (also connected to the Condition via the Mapper) will execute, and the operation cycle will continue.

As illustrated in the schematic diagram of FIGS. 5A-5B and with details in Tables 1 and 2, a system 500 may include three subsystems: a modeling subsystem 502, an instantiation subsystem 520, and a runtime subsystem 530. In FIG. 5A, the modeling subsystem 502 may include an Abstract Resource Condition Action Modeling Module 504 (e.g., a templated resource model) having a modeler for each abstract resource, where the abstract resources may be networked resources that are classified into categories defined by and conforming to a set of predefined ontologies. For instance, each networked resource, such as an abstract condition resource, an abstract data resource (e.g., information providing abstract resource), and an abstract action resource has a

TABLE 1

| Description of Components of Modules of the System | |
|---|---|
| Component | Description |
| AbstractResourceConditionAction Modeling Module | |
| AbstractConditionModeler | Reads an abstract Condition specification and then initializes and loads AbstractConditionModel into memeory, and exposes the interface used by CompositionModelServer component. |
| AbstractActionModeler | Reads an abstract action specification and then initializes and loads AbstractActionModel into the memory, and exposes the interface used by CompositionModelServer component. |
| AbstractResourceModeler | Reads abstract resource specification and then initializes and loads AbstractResourceModel into the memory, and exposes the interface used by CompositionModelServer component. |
| Composition Modeling Module | |
| ComposeEditor | Provides a textual editor for composition modeling, and exposes CompositionService as an interface. |
| CompositionModelServer | Consumes CompositionService from ComposerEditor and abstract models generated from ARCA Modeling Module, initializes and loads AbstractCompositionModel into memory, and exposes the interface used by ScriptingServer component. |
| Resource Instantiation Module | |
| ResourceLocalizationServer | Accesses the resource repository and retrieves all available resources for a particular domain based on user's preferences and context, and exposes ResourceLocalization service as an interface. |
| ResourceSelectionServer | Consumes the ResourceLocalization service, selects the resource with highest utility value assisted by Dynamic Programming algorithm, and generates InstantiatedResource as a result. |
| ScriptingServer | Utilizes InstantiatedResource to provide values for model elements in AbstractCompositionModel, and exposes ScriptingProvisionService as an interfact. |

modeler such as an Abstract Condition Modeler 506, an Abstract Action Modeler 508, and an Abstract Resource (e.g., data) Modeler 510, respectively. Through a series of input/output ports (i.e., interfaces) 512, the abstract modelers 506, 508, and 510 are connected to the Composition Modeling Module 514 within the modeling subsystem 502.

TABLE 2

| Description of Components of Modules of the System | |
|---|---|
| Component | Description |
| Process Module | |
| FacadeConnector | Connects the required interface of DataProvisionServer, ConditionEvaluationServer, and ActionEvaluationServer with the provided interface of Facade Daemon module. |
| DataProvisionServer | Supports data provision for the run-time system, consumes ConnectionService provided by FacadeConnector component, and exposes DataProvisionService as an interface. |
| ConditionEvaluation | Utilizes InstantiatedResource to provide values for model elements in AbstractCompositionModel and exposes ConditionEvaluationService as an interface. |
| ActionEvaluationServer | Evaluates actions in an action model, consumes ConnectionService provided by FacadeConnector component, and exposes ActionEvaluationService as an interface. |
| Facade Daemon | |
| InvocationServer | Performs HTTP requests to collect data from sources, consumes AuthenticationService when provided, and exposes InvocationService as an interface. |
| ResponseHandler | Handles the response of the HTTP request, consumes DaemonGatewayService, and exposes ResponseService as an interface. |
| AuthenticationServer | Provides an access token that may be used in a HTTP request of InvocationService (optional). |
| DaemonGatasayServer | Provides a single access point for Pub/Sub Proxy Module, consumes Pub/SubProxyService and exposes DaemonGatewayService as an interface. |
| Pub/Sub Proxy Module | |
| AuthenticationServer | Provides an access token that may be used in the BindingService provided by BindingServer (optional). |
| BindingServer | Allows for the binding of a Pab/SubService provided by Pub/Sub middleware, consumes AuthenticationService provided, and exposes the Pub/SubProxyService as an interface. |

Throughout the system 500, input/output ports facilitate the interface between modules.

The Composition Modeling Module 514 generates an abstract composition model (e.g., a wiring template representing an abstract user scenario) comprising the abstract conditions, abstract resources (e.g., data), and abstract actions.

The Instantiation subsystem 520 includes a resource instantiation module 522 for instantiating each of the abstract resources with a concrete resource. The resource instantiation module 522 may include a scripting server 524, a resource selection server 526 and a resource localization server 528 for accessing a domain ontology and a resource repository for retrieval of a resource for instantiating the abstract resource with a concrete resource. An abstract resource may be instantiated with a concrete resource according to a context and/or preferences defined by a user or defined by the overall operating context of the service (e.g., its jurisdiction, regulatory constraints, time period etc.). At least one abstract resource is instantiated according to a set of templated concrete conditions and concrete actions. The Instantiation subsystem 520 includes code development according to the modeling.

The Runtime subsystem 530 is illustrated in FIG. 5B continuing from the Scripting Server 524 of the Instantiation subsystem 520 in FIG. 5A. The Runtime subsystem 530 includes Runtime Engine 531 that manages a series of modules that are configured to perform a task in response to an event. The Process Module 532 may be configured to connect the instantiated resources with data provisioning, such as collecting data in response to an event, via a Data Provision Server 534 and connecting to a Condition Evaluation Server 536 and an Action Evaluation Server 538. These processes may include managing the instantiated resources and assigning a utility value to an evaluation of a condition goal model and/or an action goal model. A Facade Connector 540 connects Process Module 532 to the Facade Daemon Module 542 to perform the request associated with the event.

The Facade Daemon Module 542 may include an Invocation Server 544, a Response Handler 546, and an Authentication Server 548 that may be configured to perform the requests, handle the response to the requests such as collecting the response object from at least one source in response to the request, and provide access to the response for the Pub/Sub Proxy Module 550, respectively.

The Publish/Subscribe (Pub/Sub) Proxy Module 550 and Pub/Sub Middleware Module 560 may be configured to authenticate the response according to the result of the evaluation of the condition goal model.

According to one embodiment, implementation of the system includes three major parts: a) modeling and code generation, b) data provisioning, and c) prototype development. For the modeling and code generation, the Eclipse Modeling Framework (EMF) may be employed to build the RAMM and goal meta-model, as well as to generate code from the meta-models. For the data provisioning, Java's API for RESTful Web Services (JAX-RS) is employed to access web services. The data may be returned in JSON, XML, or HTML format on the basis of the request parameter. Then Jayway, a Java implementation of the JSONPath is adopted to analyze, transform, and selectively extract data out of the response. For the prototype development, we utilize OPC UA as the publish/subscribe middleware to support event-based communication between different software components. Specifically, Eclipse Milo, an open source of Java implementation of OPC UA, may be used to build the OPC UA server and client of the runtime system.

Figure 6:
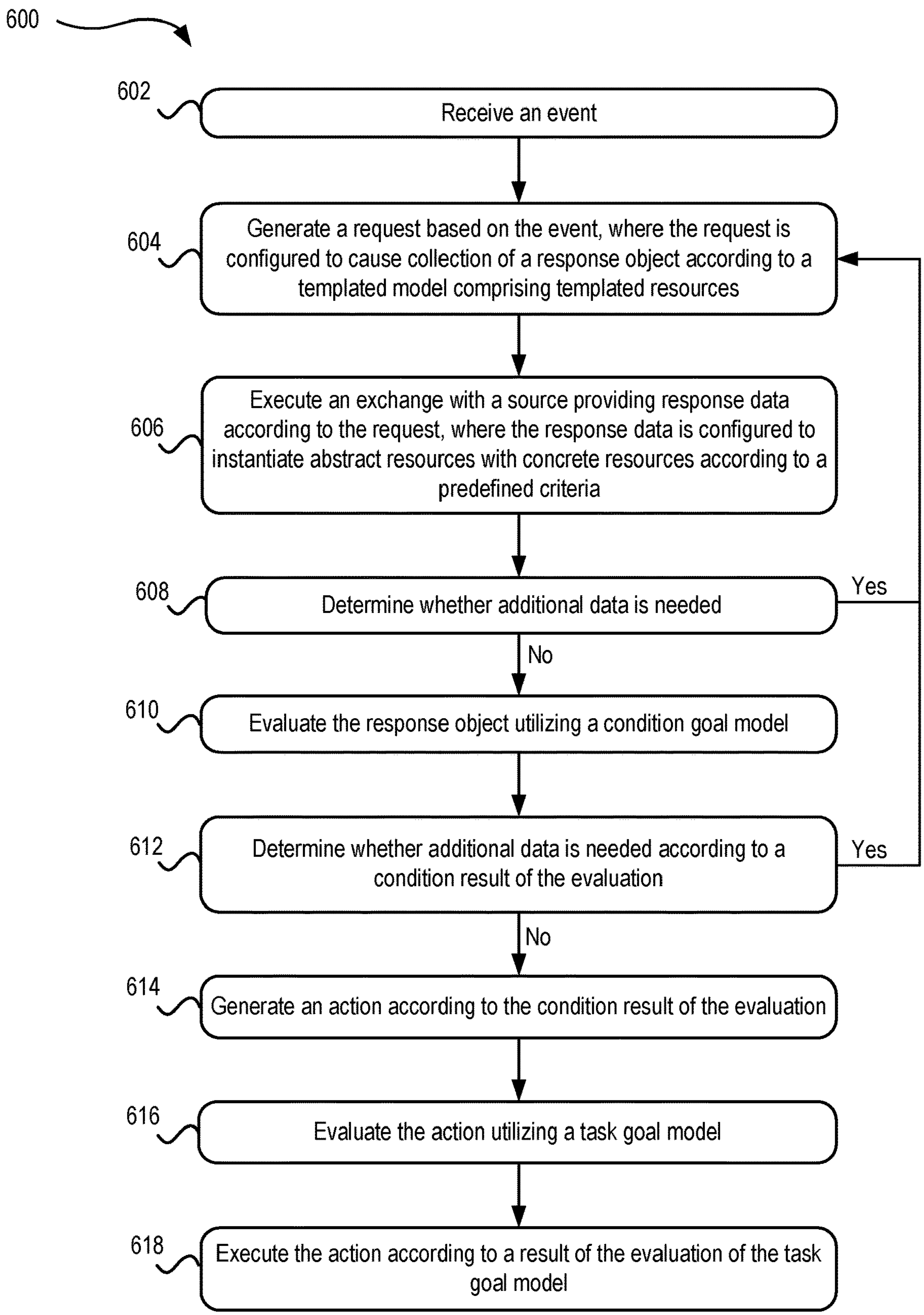
FIG. 6 is a flowchart of a method for running a customized interaction between networked resources and a user, in accordance with one embodiment of the present invention.

A second part of the operational cycle of the system is a method of running the system of a customized interaction of networked resources and users in order to perform a task in response to an event, as shown in FIG. 6. FIG. 6 depicts a computer-implemented method 600 for running a customized interaction between networked resources and a user, in accordance with one embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment.

Running the method 600 using the system as describe herein may begin with operation 602 of receiving an event. In one approach, the method 600 may be run to perform a task in response to an event using the system 500 as described in FIGS. 5A-5B. An event may be a task, a request, etc. In one approach, the event is received from the user. In one approach, the event may be a trigger to initiate the method. In various approaches, a task may be defined as an abstract task composed of abstract resources that can be instantiated with concrete resources.

Operation 604 includes generating a request based on the event. The request may be configured to cause collection of a response object according to a templated model comprising templated resources. In one approach, a response object is the response payload of an XML or JSON string received after issuing an HTTP GET request. The templated model may be generated according to the templated resources being grouped and classified into categories. The categories are defined by and conformed to a set of predefined ontologies. In an exemplary approach, the templated model may be generated according to a context defined by the user. In another approach, the templated model is assembled according to a mapping specification obtained from a repository of archived specifications.

In one approach, the templated model may include a combination of abstract and concrete resources. In one example, the templated model may include abstract data and concrete conditions and concrete actions. In another example, the templated model may include concrete data, concrete conditions, and concrete actions.

Operation 606 includes executing an exchange with a source providing response data (i.e., corresponding to a networked resource, response object, utility values, information, etc.) according to the request. In one approach, the actual response (i.e., values) may be embedded in a larger http response. The response data may be configured to instantiate abstract resources with concrete resources according to a predefined criterion (or equivalently, predefined criteria). In various approaches, the predefined criteria may include at least one of the following: an operational context of the networked resource, a monetary cost of the networked resource, a reputation of the networked resource, a quality of service (QoS) characteristic of accessing the networked resource, etc. In some approaches, the QoS characteristic may include security, latency, etc.

In one approach, the response object may be configured to instantiate abstract resources with concrete resources according to the templated model.

During the method, a determination may be made whether additional data is needed. In various approaches, additional data may be utility values, information for system operations, etc. For example, information to determine context, to support the evaluation of conditions, etc. In one approach, additional data may be needed according to the event. For example, additional data may be needed for the response to the event as this is determined by the input plugs of the resource object. In one approach, additional data may be needed to instantiate at least one abstract resource with at least one concrete resource.

Operation 608 includes a determination of whether additional data is needed. In response to a determination that additional response is needed, the method returns to operation 604 and a second request may be generated based on the event. The second request may be configured to cause collection of an additional response object according to the templated model.

In response to a determination that no additional data is needed, operation 610 includes evaluating the response object utilizing a condition goal model. In one approach, the condition goal model may be a set of templated concrete conditions based on context including a user profile and user defined objectives.

In one approach, a condition result of the evaluation may be a utility value assigned to the response object. For example, objective criteria that may contribute to a high utility value include monetary cost, violations of policy, performance, latency, etc.

Following the evaluation of the response object utilizing the condition goal model, operation 612 includes a determination whether additional data is needed. In response to a determination that additional response is needed, the method returns to operation 604 and a third request may be generated based on the event. The third request may be configured to cause collection of an additional response object according to the condition goal model.

For example, for each networked resource, the condition may be evaluated because instantiation of an abstract resource with a concrete resource is not automatic. The abstract resource and the concrete resource need to be connected and the concrete resource needs to satisfy a set of conditions. Thus, for each step, an evaluation of whether the response object satisfies the conditions may result in a need for additional data before proceeding to the next task, step, operation, etc. In one embodiment, each set of conditions may be established as a condition goal model according to a context defined by the user. In other embodiments, other models, or third party external services, which can deduce whether a condition is satisfied, can also be used.

In response to operation 612 that a determination is made that no additional data is needed, operation 614 includes generating an action according to a condition result of the evaluation of the response object. The evaluation utilizes the condition goal model in operation 610.

Operation 616 includes evaluating the action utilizing a task goal model. The task goal model may be defined by characteristics of the event.

Operation 618 includes executing the action according to a result of the evaluation of the task goal model. The evaluation of the task goal model may include evaluating the utility value of the result according to the event. In one approach, the characteristic of the action may be adjusted according to the utility value of the response object and the evaluation result. For example, the action may be maximized in response to a determination that the utility value of the response object may be above a predefined threshold, such as the utility value of the response object indicates that the response object is beneficial. Alternatively, the action may be minimized in response to a determination that the utility value of the response object is below a predefined threshold, such as the utility value indicates the response object is not beneficial.

Figure 7:
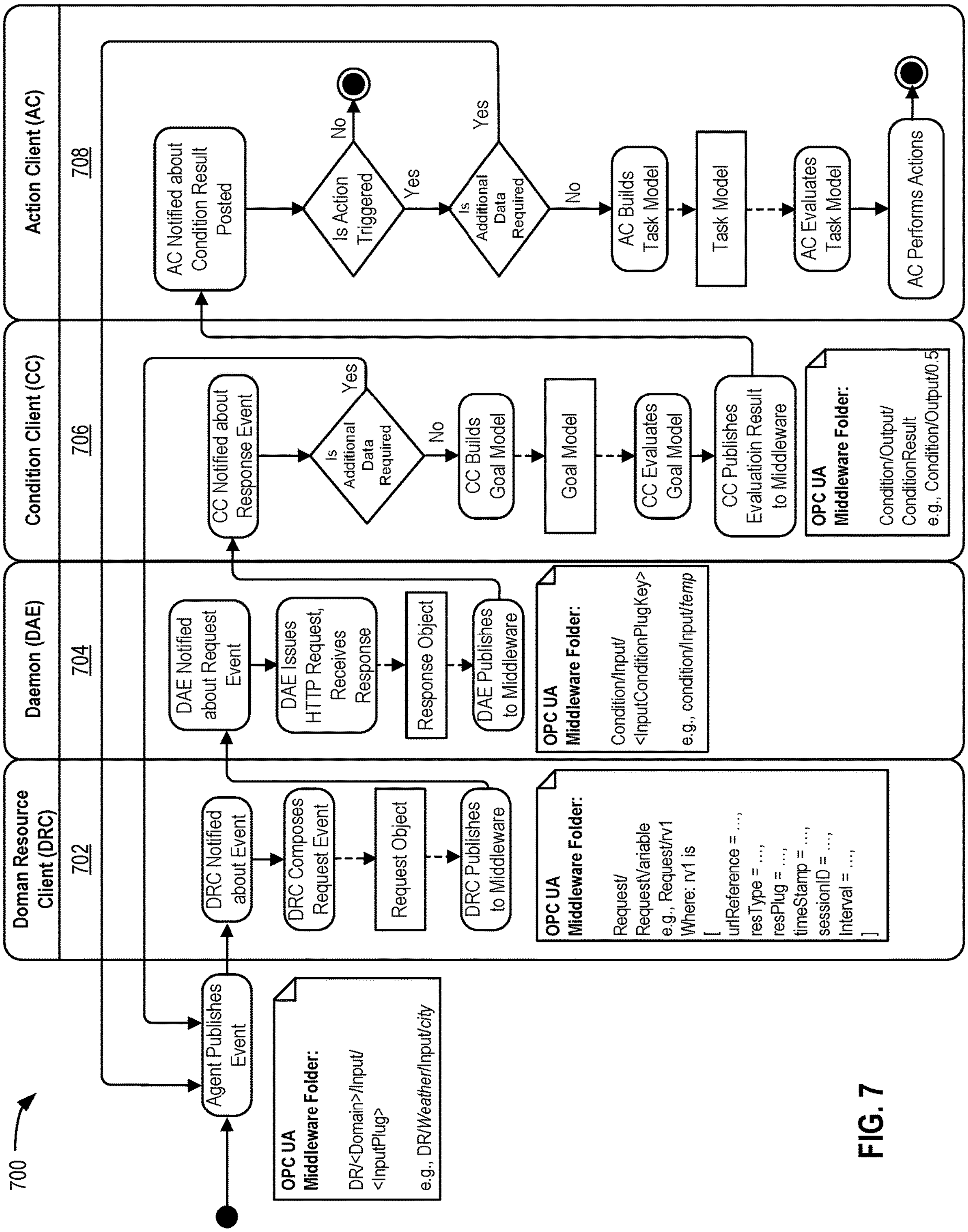
FIG. 7 is an activity diagram of Runtime System, in accordance with one embodiment of the present invention.

As an example of the operational cycle and method as depicted in FIG. 6, an activity diagram of the runtime system 700 with the activities of each client is illustrated in FIG. 7. The responsibilities of five clients of the system as described herein are as follows:

DomainResourceClient (DRClient) 702—Creates nodes in the server for all inputs for each DomainResource and subscribes to them. Upon receiving a new value, constructs a new Request node.

DaemonManager—Creates a thread pool based on the size of the DomainResource, subscribes to the RequestHolder node. Upon receiving a new value, dispatches the thread execution to the Daemon.

Daemon 704—Performs HTTP requests to collect any required data and writes the response data to the corresponding nodes in the server. Subscribes also to the Request node.

ConditionClient 706—Loads all the condition goal models, subscribes to the Response node. Upon receiving a new value, re-evaluates the Goal Model (i.e., the Condition) and publishes the result to the server.

ActionClient 708—Subscribes to the corresponding condition results. Upon receiving a new value, determines whether to trigger the specified action or not, and if yes, loads the corresponding task model and performs the sequence of actions which is specified in the task model (e.g., a BPEL process).

Figure 8:
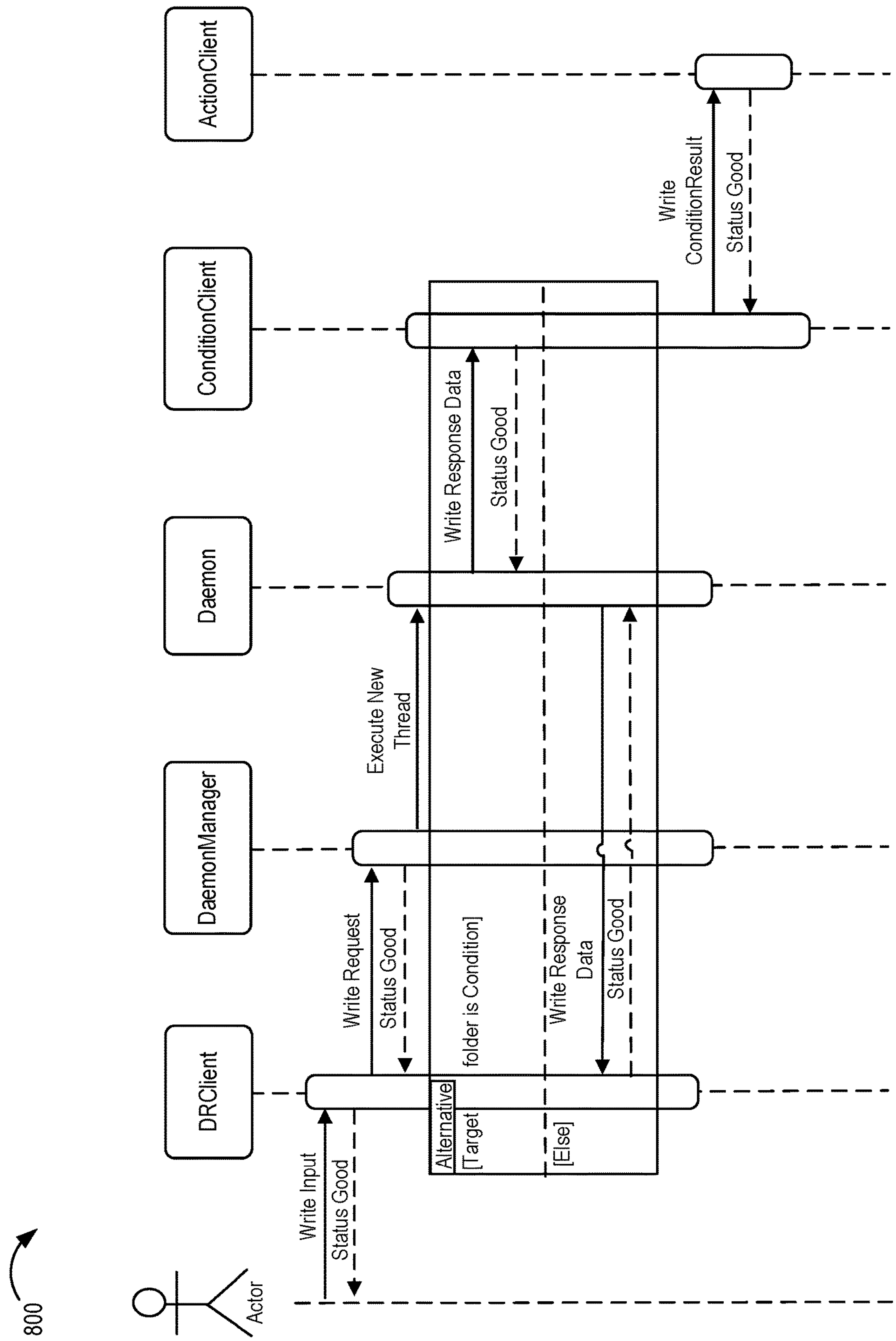
FIG. 8 is a sequence diagram of Runtime System, in accordance with one embodiment of the present invention.

A sequence diagram shown in FIG. 8 illustrates a third part of implementation of demonstrating a use case of a user interacting with the system 800. The runtime system proceeds as follows: First, an actor (e.g., user) initiates a request (e.g., an event). The DomainResourceClient receives the event, composes an HTTP request, and sends the request to the server. Then DaemonManager receives the request and dispatches the data collection job to the Daemon. The Daemon retrieves the data and writes to the server, the Condition Client evaluates the condition goal model and produces a fuzzy value result. The ActionClient is notified and performs a reasoning process based on associated Action model and compiles possible action plans if needed.

Modeling of Generic and Instantiated Resources

Turning now to the parts of the system, the first part of the system includes the modeling (402 of FIG. 4) and instantiation (404 of FIG. 4) of resources. The modeling may be defined as creating a model to describe resources, where the resources are defined as abstract resources. The first part includes denoting internetworked agent resources at a generic level (e.g., a higher level of abstraction). According to one embodiment, a meta-model is devised to represent internetworked agent resources as templates (e.g., "weather service," "a bank account balance," etc.) and to provide a unified interface to access resources and their associated data representations. A specific resource is a concrete example of the abstract resource, for example "a checking account" is a concrete resource of the abstract resource "a banking account."

In some instances, the meta model may conform to different schemas. In one approach, the templated model (e.g., meta model, abstract model) includes templated personal resources according to a context of a user. In one approach, a generic programming (e.g., an abstraction) is an essential first step for facilitating a programming model for Internetworked agent-oriented application development. In one example, initial steps for implementing the generic programming may include NodeRed framework and the IFTTT framework. In a preferred approach, a much richer framework for specifying agent interactions may include a framework based on goal modeling.

According to one embodiment, a first component is the design of a meta-model which aims to denote generic IoT agent resources (i.e., abstract resources, templates), each one related to a specific domain (e.g., banking, insurance, healthcare, etc.). Those templated agent resources are instantiated and reference concrete individual resources or service endpoints. The instantiation process is based on a resource selection algorithm (e.g., an optimization dynamic-programming based knap-sack type of algorithm for our implementation) that selects those resources that can instantiate generic resources, and at the same time minimizes the overall cost (e.g., latency, monetary cost, etc.) while maximizing the overall gain (e.g., security, performance, reliability, etc.). The abstract resources (e.g., generic resources) may be part of an ontology which ensures that the instantiated resources conform with the typing and input/output ports (i.e., plugs) as specified in the corresponding abstract resources.

According to one embodiment, a model is assembled to create an abstract template, and to group and classify internetworked Web resources. For example, resources such as data, service addressable with a uniform resource identifier (URI), etc. are grouped into categories that may be defined by and conform to user defined, standardized, etc. ontologies. These models may be referred to as generic, abstract, templated, etc. web resources defined by a user.

Figure 9A:
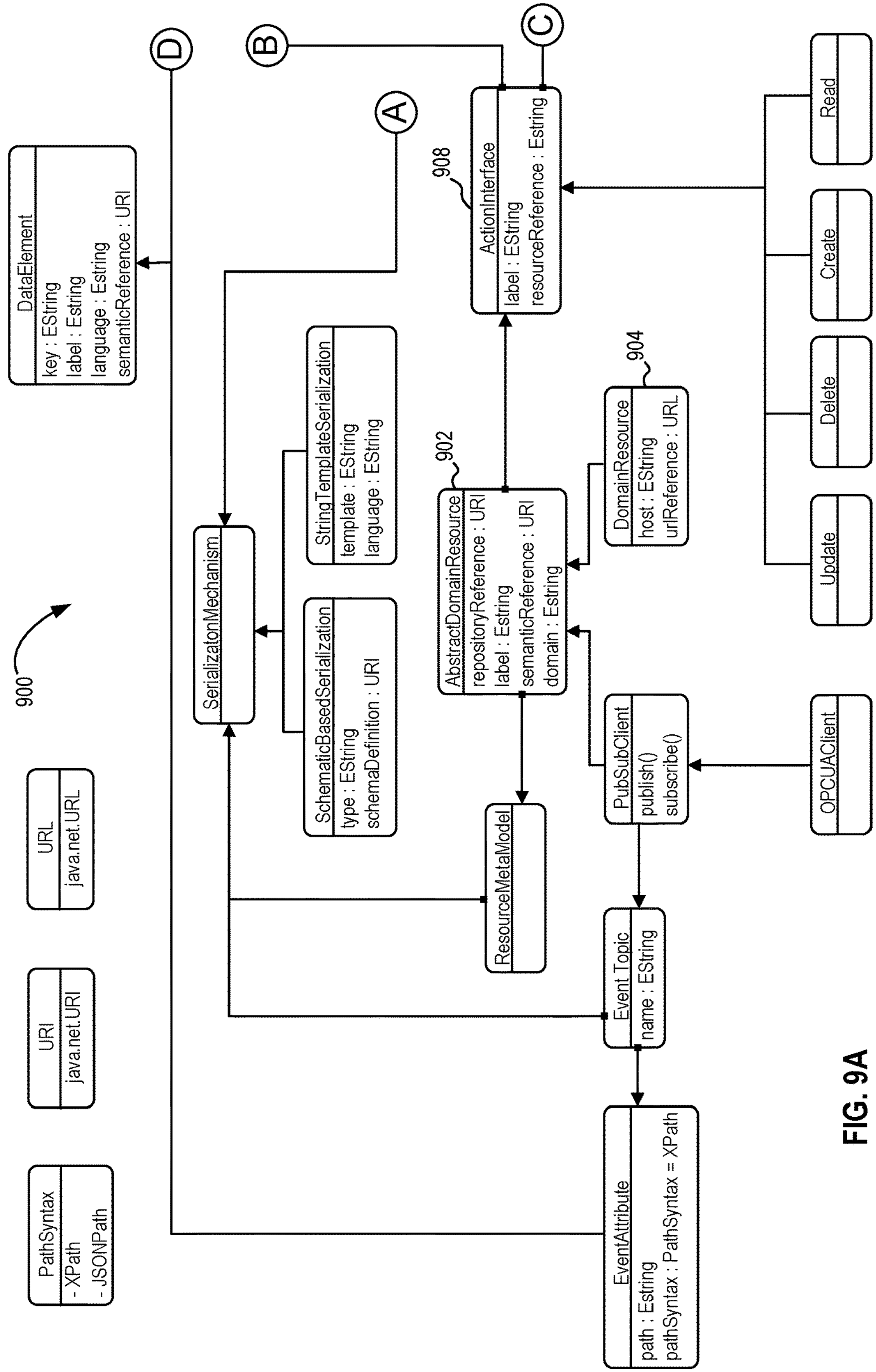
FIGS. 9A-9B is a diagram of a Resource Abstraction Meta-model, in accordance with one embodiment of the present invention.
Figure 9B:
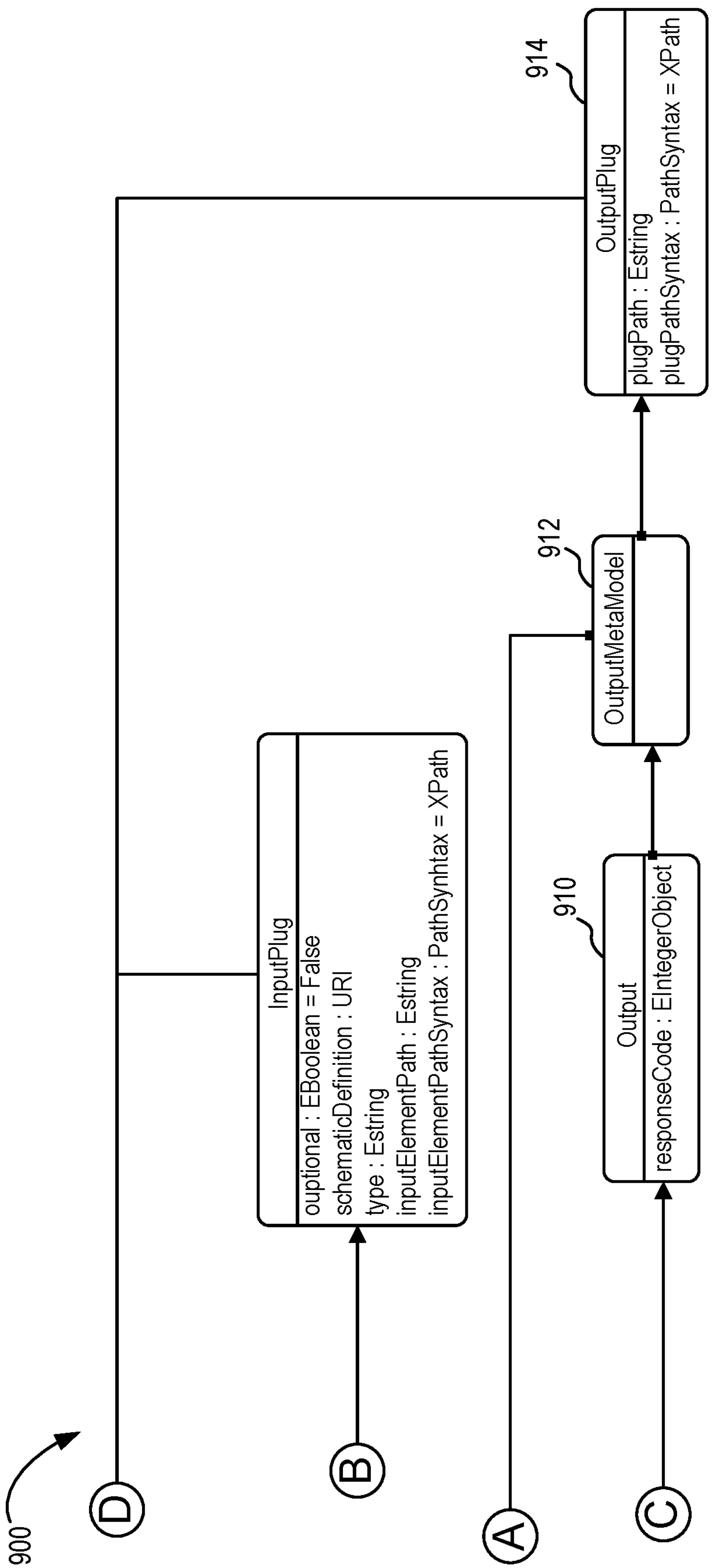

As described herein, various embodiments include a templated model of resources (e.g., abstract model, templates), which provide a template for resource categories and service interfaces. The abstract resource meta-model 900 (e.g., Resource Abstraction Meta-model, RAMM) is illustrated in FIGS. 9A-9B. The model 900 denotes the nature, capabilities, and interfaces (i.e., input and output plugs) of templated resources (e.g., generic, abstract, etc.) specific for the model 900 which serve as "templates." As shown in FIG. 9A, the main element of the model 900 is the AbstractDomainResource 902, which represents abstract resources for a particular domain. An AbstractDomainResource 902 has references to the resource repository and the domain ontology which are useful in the instantiation process by discovering the proper resources. After instantiation, the "host" and "urlReference" attributes of DomainResource 904 are given specific values. The former specifies the provider of the resource, and the latter provides the URL or the URL template of the resource, when the abstract resource is associated with a single concrete resource, e.g., an underlying instance resource.

Figure 10A:
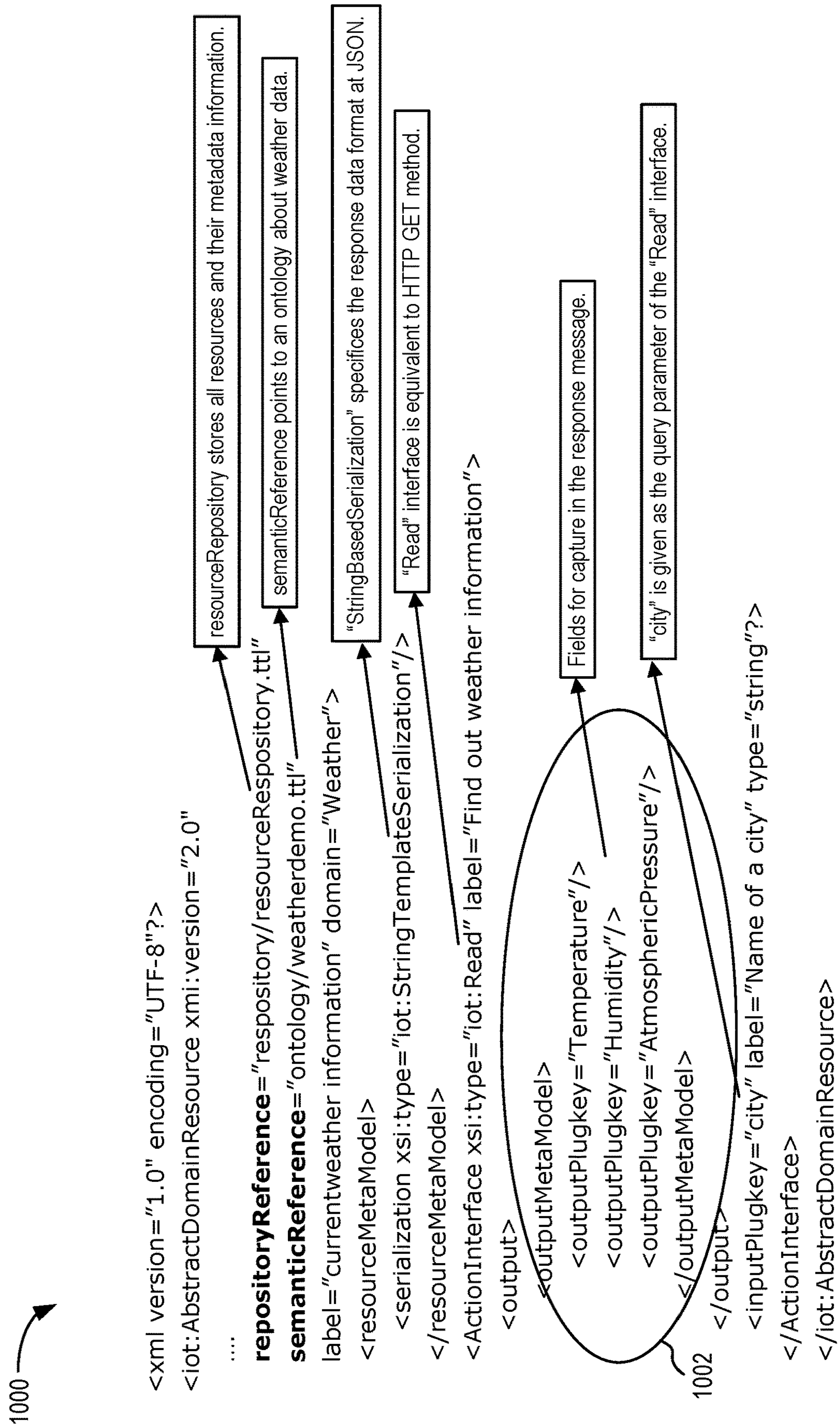
FIG. 10A is an example of programming of an Abstract Resource, in accordance with one embodiment of the present invention.

As an example of programming according to the model 900, FIG. 10A depicts the programming for abstract weather service resource 1000 according to a resource meta-model such as the model 900 of FIGS. 9A-9B. The series of commands 1002 of FIG. 10A correspond to the elements including the ActionInterface 908 of FIG. 9A leading to Output 910, OutputMetaModel 912, and OutputPlug 914 of FIG. 9B.

Figure 10B:
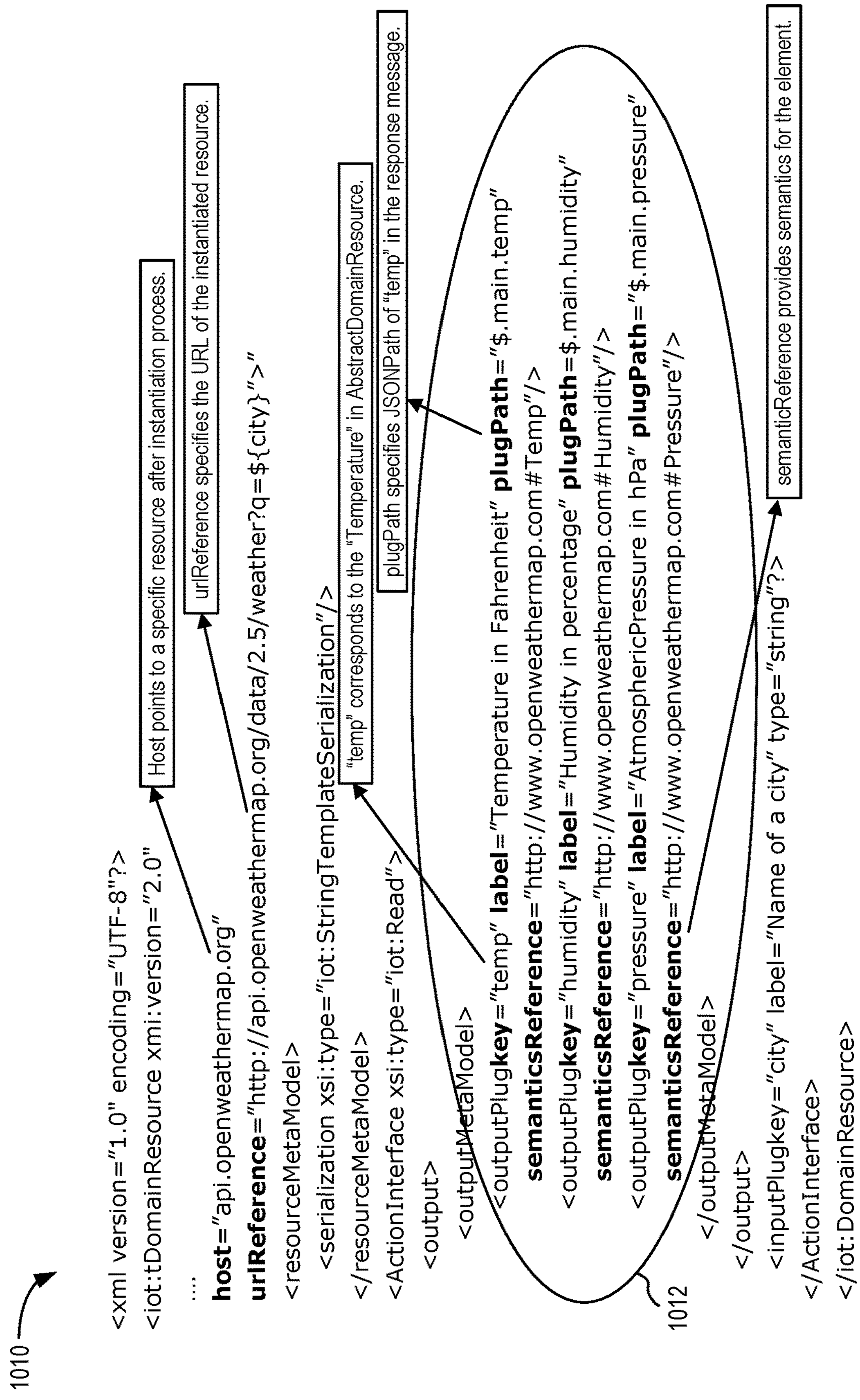
FIG. 10B is an example of programming of an instantiated resource, in accordance with one embodiment of the present invention.

In comparison, and as an example only, the programming of an instantiated concrete resource 1010 of the abstract weather service resource is depicted in FIG. 10B. The series of commands 1012 correspond to the instantiated generic resource that may represent a concrete resource.

Each abstract (e.g., templated, generic, etc.) data resource may be associated with an ontological term for determining its category, semantics, and purpose. In one approach, OWL (Web Ontology Language) is utilized to develop domain ontologies. To resolve semantic heterogeneity, local ontologies of each data source are developed independently while capturing local specific information. Next, a global ontology is constructed by extracting common terms used in the local ontologies. Semantically equivalent entities are mapped between global and local ontologies. Three built-in properties include: owl:equivalentClass, owl:equivalentProperty, and owl:sameAs in OWL for mapping equivalent classes, properties, and individuals, respectively. In addition, the Resource Description Framework (RDF) is employed to serialize OWL. Furthermore, SPARQL (i.e., RDF query language) is utilized to query all available resources in the repository.

Figure 11:
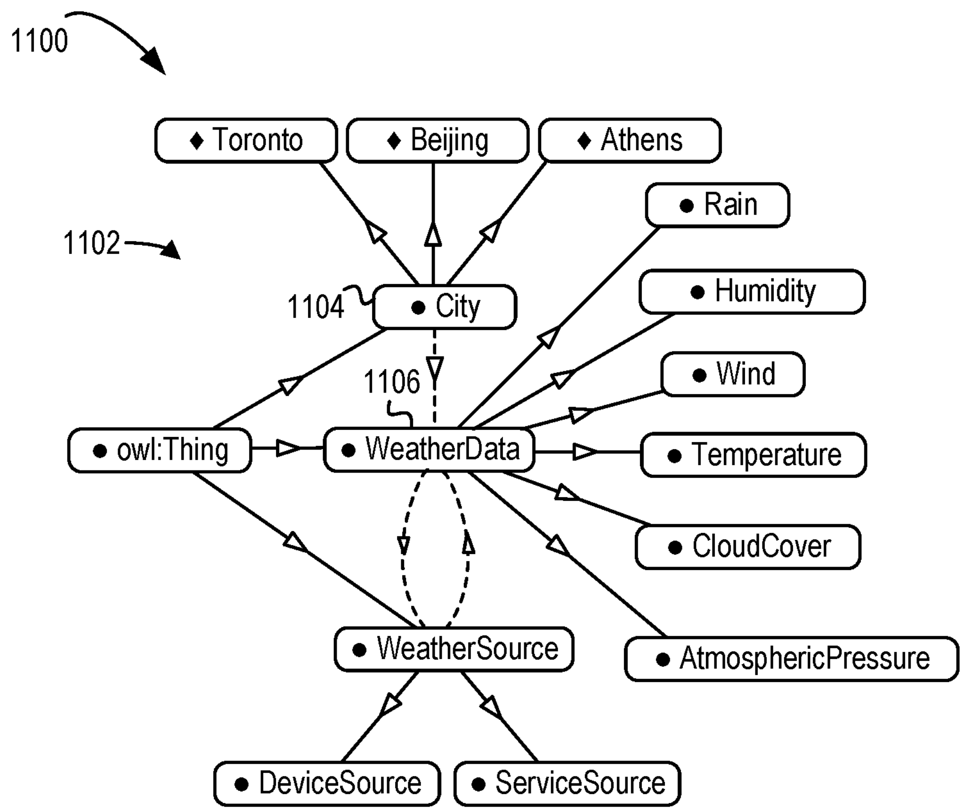
FIG. 11 is an example of an Ontology, in accordance with one embodiment of the present invention.

As an example, FIG. 11 illustrates an example of an ontology 1100 used for the instantiation process in such a weather service domain 1102. A weather service domain 1102 for a specific city 1104 includes processing weather data 1106.

Resource Instantiation Process

Figure 12:
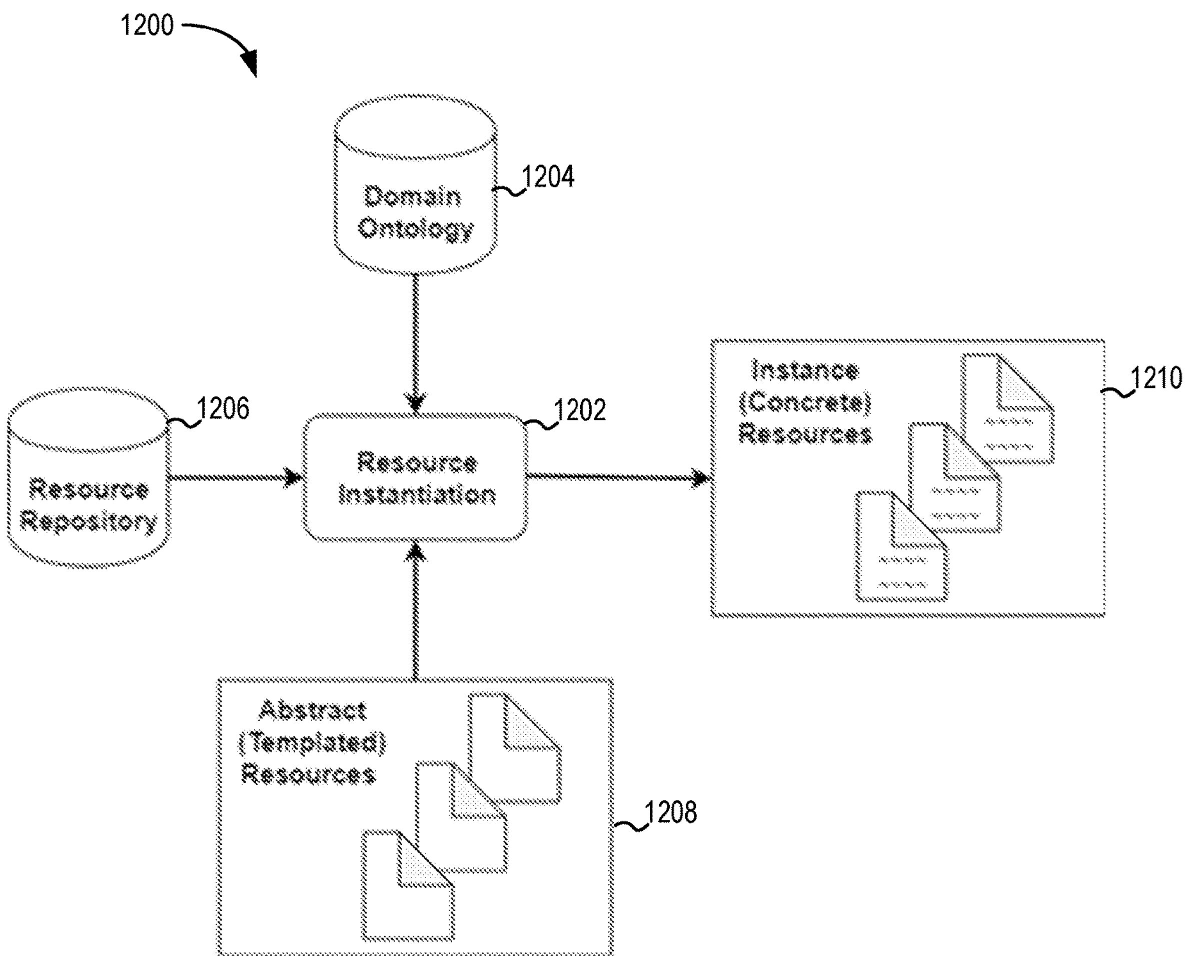
FIG. 12 is a diagram of a Resource Instantiation Framework, in accordance with one embodiment of the present invention.

An instantiation process is a program that aims to optimize according to a predefined criterion. An abstract resource (e.g., generic, templated, etc. resource) may be instantiated with a concrete resource. In various approaches, an abstract resource may be instantiated with different resources in many different ways. An illustration of a resource instantiation framework 1200 is illustrated in FIG. 12. The resource instantiation 1202 includes two main components: a) the domain ontology 1204, and b) the resource repository 1206. The domain ontology 1204 provides a common vocabulary for a certain domain. The resource repository 1206 stores all available resources for that domain. After semantic mapping among ontologies and resource selection from the repository, generic (e.g., abstract, template, etc.) resources 1208 are instantiated to instance (e.g., concrete) resources 1210.

The instantiation of the abstract resource may be static. Alternatively, the instantiation of the abstract resource may be dynamic. In one approach, the instantiation of an abstract (e.g., generic) resource may be according to selection criteria according to a specific operational context the resource (e.g., a networked resource). In other approaches, the instantiation of an abstract resource may be according to other selection criteria such as the monetary cost of the networked resource, the reputation of the networked resource, the quality of service (QoS) characteristics of accessing the networked resource (e.g., security, latency, etc.), etc. For example, in one approach, a "voting algorithm" may be applied to select a service among alternative concrete resources returned by the instantiation process.

In some approaches, the selection of the appropriate concrete conditions and concrete actions from templated ones may be static or dynamic. The selection may be based on context (i.e., the user profile, type of resources involved on the scenario plan enacted, etc.) and with respect to a given collection user objectives or goals.

According to one approach, an event-driven method allows for the dynamic and ad-hoc exchange of information and the coordination of such information-exchange thereof among the addressable resources using input and output plugs as interaction endpoints. Preferably, the ad-hoc and not-prescribed interaction scenarios may be enacted at a run time and among the right resources. For instance, the interaction scenarios may include essential resources.

According to one approach, the wiring of resources may be at a specific time thereby forming user scenario plans. For example, in one approach, the specific time may be at design time (e.g., static). In another approach, the specific time may be at run-time (e.g., dynamic) of the method. The wiring may utilize a Mapper specification. In one approach, the Mapper (i.e., the wiring of resources) may be defined by the user. In another approach, the Mapper may be generated by an automated process based on user goals.

For example, to illustrate the system without limiting in any way, each candidate resource is considered that may be able to instantiate an abstract resource. Each candidate resource is associated with a five-dimensional vector describing its QoS features, e.g., response time, cost, accuracy, availability, and reliability. Based on these QoS metrics, a utility score may be calculated for each resource. In one approach, the utility score may be computed as function of user preferences and profile (i.e., for one user security is more important, while for another user reliability has greater importance). A goal of the resource selection and instantiation step is to select exactly one concrete resource for each abstract resource so that the overall composition as specified by the Mapper is optimal.

In a prototype implementation, selecting exactly one concrete resource for each abstract resource is formulated as 0-1 Multiple Choice Knapsack Problem (MCKP), which may be computationally difficult to solve for large numbers. To optimize efficiency, utilizing dynamic programming may reach a global optimal solution. In another approach, the instantiation process may select more than one concrete resource, and a voting or meta-selection process zooms-in on the optimal service/resource to be used at any given context and situation, as the user-resource and resource-resource scenario unfolds.

Example of a Resource Instantiation Process

As an example, FIG. 13 illustrates a process of instantiation of an abstract data resource (e.g., an abstract domain resource, a generic data resource, etc.). An abstract data resource 1302 depicted as an abstract domain resource $ADR_1$ corresponds to a weather domain and may have three concrete resources 1304 such as $DR_{11}$, $DR_{12}$, and $DR_{13}$ associated with the weather domain $ADR_1$. These concrete resources 1304 may be defined as:

$DR_{11}$: developer.yahoo.com/weather $DR_{12}$: api.openweathermap.org $DR_{13}$: api.google.weather Each of the concrete resources 1304 may instantiate the abstract resource 1302, e.g., $ADR_1$. The system selects an optimal concrete resource 1304 for instantiating the abstract resource 1302.

In one approach, the implementation of resource selection may be modeled as a knapsack problem. Each resource has a utility score and a response time. The problem is to identify the collection of resources (i.e., the items of the knapsack) that instantiate abstract resource specifications by maximizing the total utility values without violating the total response time limit. For example, as depicted in FIG. 13, three generic resources 1302 such as $ADR_1$, $ADR_2$, and $ADR_3$, each may be instantiated by three concrete resources 1304, $DR_{11}$, $DR_{12}$, $DR_{13}$ for $ADR_1$; $DR_{21}$, $DR_{22}$, $DR_{23}$ for $ADR_2$, and $DR_{31}$, $DR_{32}$, $DR_{33}$ for $ADR_3$. In one approach, the resource selection and instantiation step may select exactly one concrete resource for each generic resource. For example, as shown in FIG. 13, selected concrete resources for each generic resource have a hatched pattern, e.g., $DR_{12}$ for $ADR_1$, $DR_{21}$ for $ADR_2$, and $DR_{33}$ for $ADR_3$.

Condition and Action Model

In one approach, goal modeling may be employed for specifying and evaluating Condition models, as well as Action models (e.g., specifying the invocation of a service on a resource or the compilation of action plans) when the aforementioned condition models are satisfied. In various approaches, a set of templated concrete conditions and concrete actions is part of a goal model. For the Conditions, goals may represent conditions. Alternatively, goals may state the truth value being evaluated by appropriate Evaluator classes attached to each node in the Goal Model. The Evaluator classes may implement the same interface (i.e., the EvaluatorInterface) exposing the method evaluate( ).

An example of a goal model 1400 is depicted in FIG. 14A. An example of programming associated with the goal model 1400 is depicted in FIG. 14B. As shown for node G3 1402, Evaluator class (say G3_Evaluator) attached to a node (e.g., G3, assuming subgoal G3 requires an inputValue i.e., temp to be evaluated) shows a condition of True/False to be satisfied. Here the RootGoal 1404 is the top Condition to be satisfied.

Goal models may be based on AND/OR decompositions and on contribution links between the nodes (++S, −−S, ++D, −−D). For example, contribution links describe how the satisfaction (S) or denial (D) of the source node affects the target node. As illustrated in FIG. 14A, an ++S link between the G4 and G5 notes indicates the satisfaction of the source node G4 affects the satisfaction of the target node G5.

In addition, conditions may be evaluated within the condition goal model with a certain degree of probability. For example, if the condition is satisfied above a predefined threshold, the resource, task, etc. may proceed. Goal Models is one possible way to denote conditions. Other models (e.g., fuzzy logic, rules, etc.), third party external services, etc. can also be used to deduce whether a condition is met or not.

An Action model represents tasks or atomic actions the system has to perform in order to achieve the top level task (i.e., the root of the action model). After building goal models for the Conditions and Actions, reasoning techniques are applied to evaluate the Condition Goal model and compile an action plan (i.e., what to invoke and in which order) as specified by the Action model.

Figure 15:
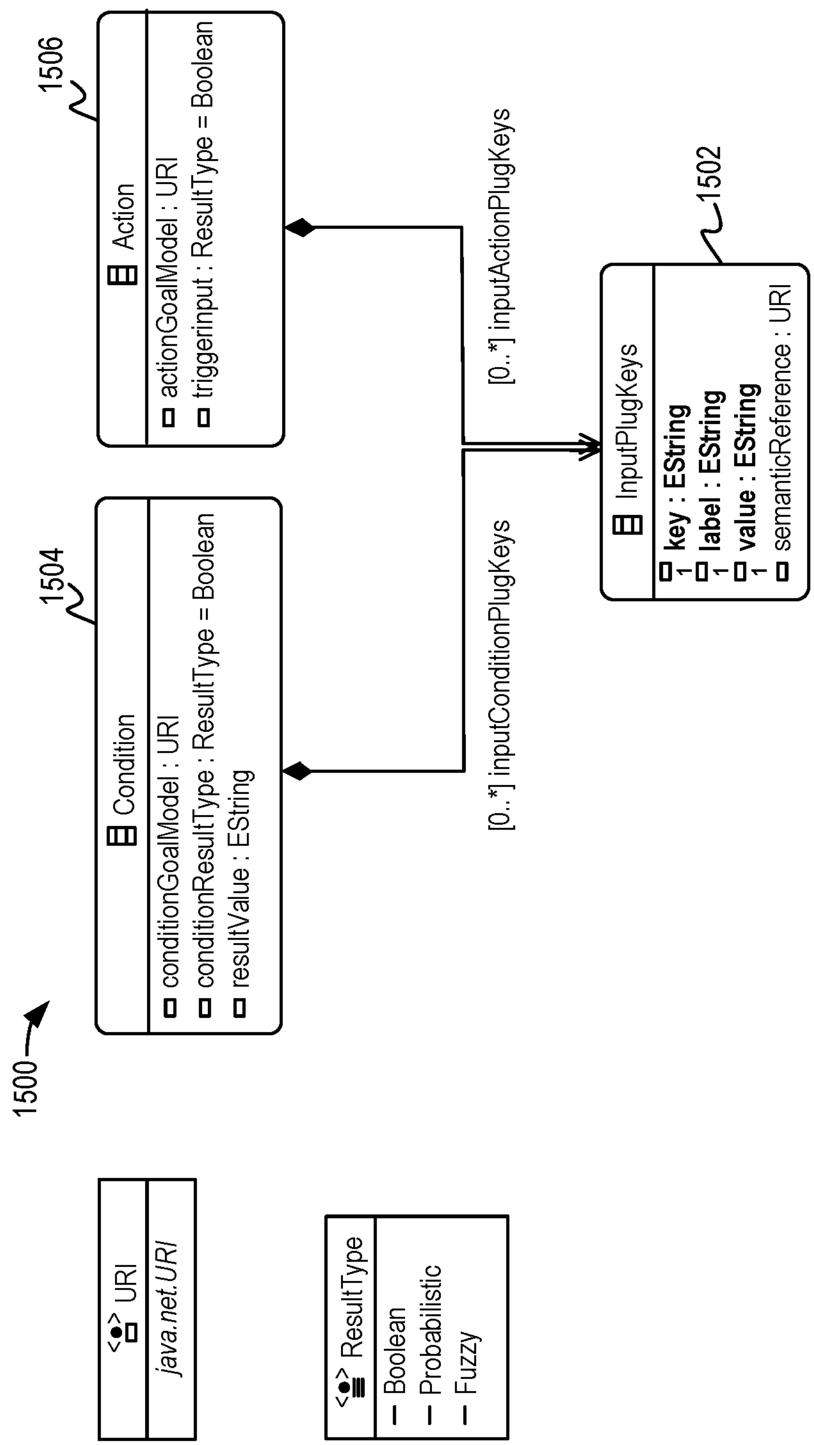
FIG. 15 is diagram of the relationship between Plugs, Conditions, and Action, in accordance with one embodiment of the present invention.

A Condition and Action meta-model 1500 is depicted in FIG. 15 and illustrates the relationship between plugs 1502 in the Condition and Action meta-model elements 1504, 1506, respectively. Both the Condition and the Action meta-model elements 1504, 1506 associate with InputPlugKeys 1502 that are distinctly specified for the mapping (e.g., the composition of the resources, the conditions, the actions, etc.). In one example, as illustrated in the goal model 1400 of FIG. 14A, a Condition and Action meta-model may represent an Evaluator attached to node G3 1402. In this context, the Mapper meta-model is used to map between resources, conditions and actions as described in the next section of Resource Composition.

FIG. 16 illustrates a schematic diagram of a Condition and Action Model Meta-model 1600 for applying goal modeling to represent both Condition and Action models. A reasoning process is applied on each goal model for Conditions and Actions. In one approach, Boolean logic-type reasoning may be utilized to obtain a satisfied/not-satisfied condition result. Alternatively, fuzzy reasoning may be applied to obtain a satisfied/not satisfied condition result and the satisfaction degree of the root goal. When the Goal Model denoting a Condition is evaluated to True (e.g., to an adequate level of satisfaction), the Action model is invoked to execute one or more predefined services as specified in the Action model. In one approach, the reasoning on evaluating the truth value of the Goal models (i.e., the Conditions) and the analysis the Action Models (i.e., what to be invoked as a result), may be based on techniques generally understood in the art.

Resource Composition

A challenge of a system for customizing interactions between networked resources and users includes devising and efficiently applying a feasible composition model whereby agent resources may be composed to form operational scenarios. In particular, there are issues with connecting agent resources with condition models, condition models with action models, and action models with event models that may trigger or invoke services or access other resources.

According to one embodiment, a component is the design of a service composition model, referred to as the Mapper. The Mapper specifies the way: a) abstract resources (serving as data producers) are connected with condition templates (which serve as consumers) for evaluating conditions as part of the specified scenario; b) conditions are connected with actionable services or other abstract resources (to perform actions if the conditions are satisfied); and c) the results of actionable services (serving as producers) are connected to other abstract resources (which serve as consumers). Such a Mapper provides a "specification" for an "abstract" or "templated" interaction scenario between abstract resources. A Mapper is a model that composes conditional structures and data as abstract resources through plugs (e.g., input/output ports). The Mapper allows an abstract assembly to be instantiated to a concrete assembly.

Figure 17A:
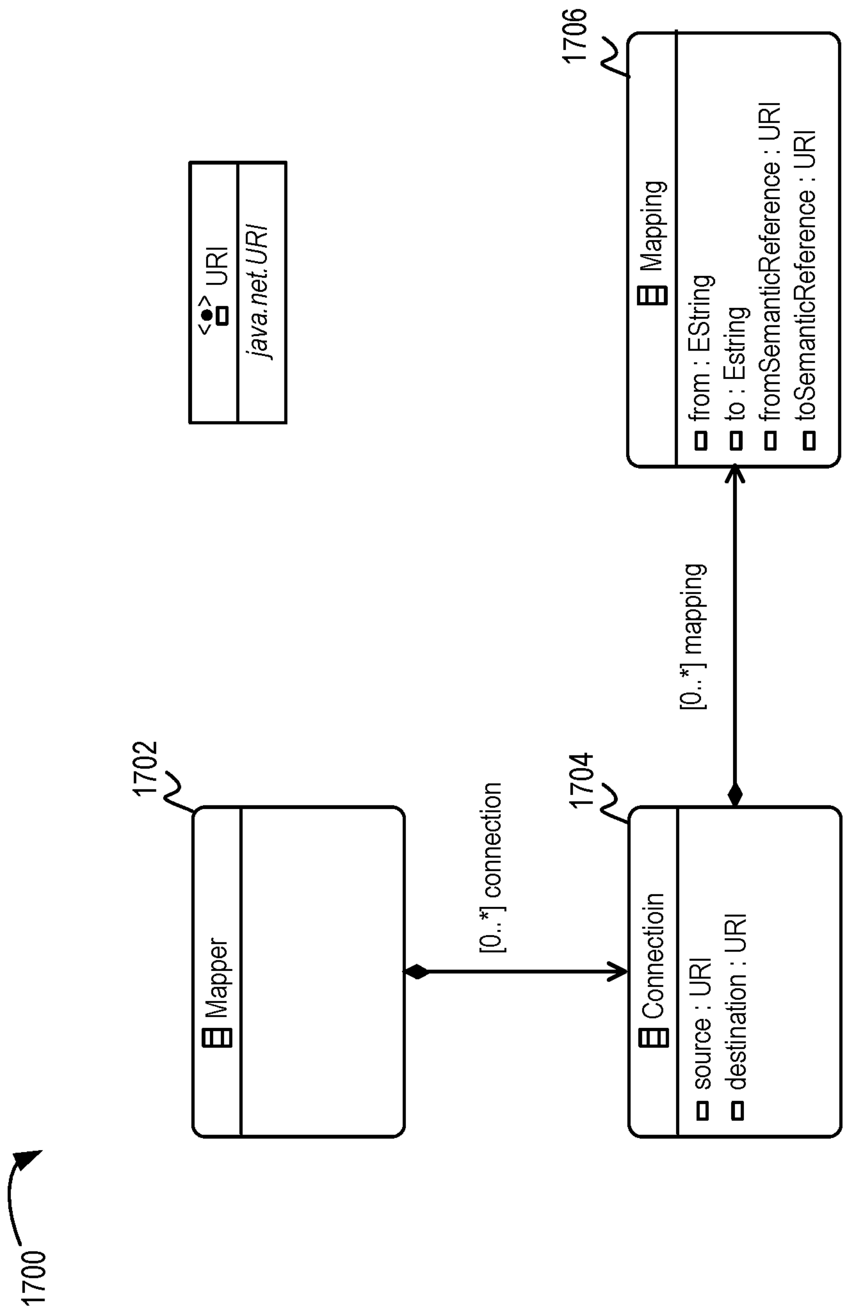
FIG. 17A is a diagram of a Conceptual model of the Mapper models, in accordance with one embodiment of the present invention.

According to one embodiment, the programming model may be based on composing resources with Conditions and Actions. In one approach, an assembler, e.g., a Mapper, may create the composition of resources with Conditions and Action by denoting how inputPlugs and outputPlugs in resources, conditions and actions, are linked. FIG. 17A illustrates a meta-model 1700 of a Mapper 1702. A Mapper 1702 is composed of multiple Connections 1704, which specify an association between two instances (e.g., between a resource and a condition, between a condition and an action, etc.). Each Mapping 1706 in the Connection 1704 specifies a particular element for mapping.

Figure 17B:
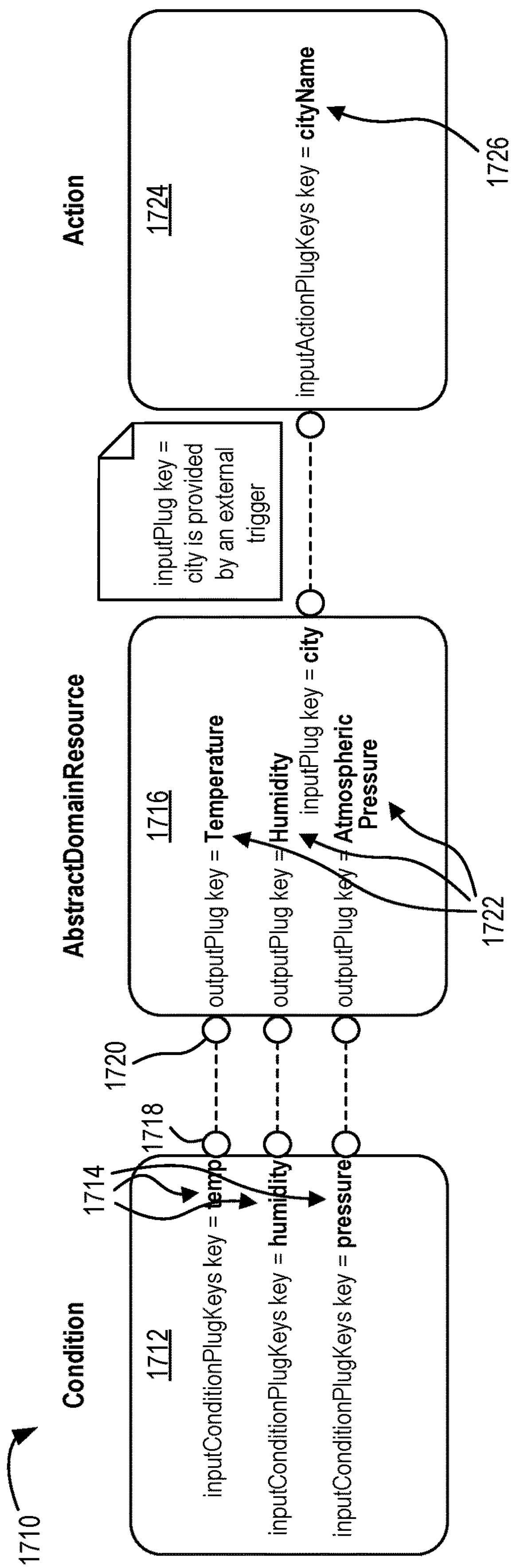
FIG. 17B is a schematic diagram of an Example Mapper, in accordance with one embodiment of the present invention.

As an example, a schematic diagram of an abstract model 1710 managed by a Mapper for a Weather Domain is illustrated in FIG. 17B. The abstract model 1710 is instantiated into a concrete model depending on a context of the client, user, etc. As shown in the abstract model 1710, three types of resources are considered. Conditions 1714 are resources that evaluate whether the task may proceed. Actions 1726 are resources that form a task, produce results, execute processes, etc. An action may be consumed by a condition, by an option, etc. Abstract Domain Resources 1722 represent information, data, etc.

The Mapper may assemble the resources into the abstract model 1710 as follows, the Condition module 1712 provides concrete condition resources 1714 that interface with the AbstractDomainResource module 1716 via input ports 1718 and output ports 1720. The AbstractDomainResource resources 1722 may represent concrete data, for example, specific concrete resources temperature, humidity, and pressure. The Action module 1724 includes a concrete action 1726 in response to a request for a city provided by an external trigger, where the concrete action 1726 requires a city name. The interface between the AbstractDomainResource module 1716 and the Action module 1724 is connected via input/output ports.

FIG. 17C depicts an XML form of the Mapper which links the abstract resource stored in file template.iot, the Condition specification stored in file condition.iot and the Action specification stored in file action.iot. These specifications are instantiated by the concrete resource openweathermap.com, the concrete condition condition.goal and the concrete action action.bpel.

Returning to the example of a model of Weather Data, according to one approach, a system models weather data sources providing temperature, humidity, and atmospheric pressure, has a condition resource which sets input numerical values for these three data items, an action resource for producing a sample output, and a Mapper module that links the weather resource, the condition resource, and the action resource together utilizing input and output plugs.

FIG. 18A depicts a model of an abstract resource related to information in the weather domain. The abstract weather resource is stored in the file template.iot. It has one inputPlug key labeled by the term "city" (String) and three outputPlug keys labeled by the terms "Temperature", "Humidity", and "AtmosphericPressure". The ontology associated with the terms appearing in this abstract resource are specified in the file weatherdemo.ttl, and the domain of the abstract resource is "Weather".

FIG. 18B depicts an instantiated (concrete) resource for the abstract resource of FIG. 18A. The instantiated resource references the http://api.openweathermap.org/data/2.5/weather?q=${city} service endpoint. The instantiated resource is compatible with the abstract resource as it has one inputPlug ("city") key and three outputPlug keys "temp", "humidity" and, "pressure". The association between these terms is provided by the ontology and the Mapper.

FIG. 19A depicts a Condition specification stored in the file condition.iot which denotes a condition which is to be evaluated using here Fuzzy logic. The Condition requires three input values (see inputConditionPlugKeys element), and references a specific Condition resource (i.e., a goal model) in the file condition.goal.

Figure 19C:
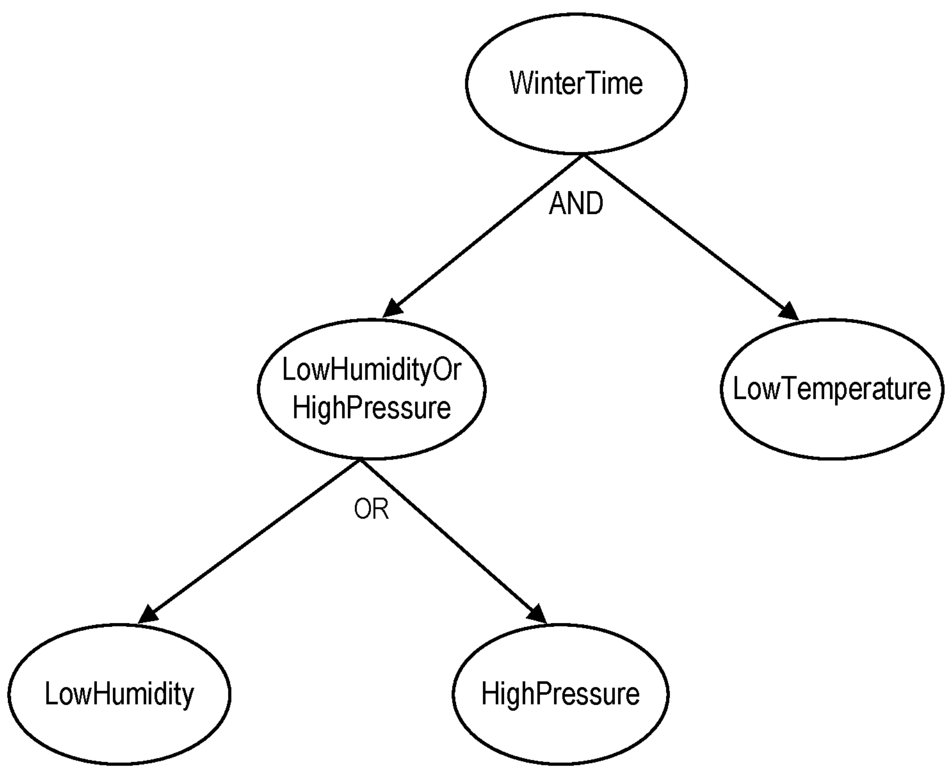
FIG. 19C is a schematic diagram of an example of the goal model with the label "WinterTime," in accordance with one embodiment of the present invention.

FIG. 19B depicts a Condition resource stored in condition.goal file, and as referenced by the condition specification stored in the condition.iot file. The condition specifies a complex model and includes AND and OR decompositions, as illustrated in the schematic of FIG. 19C.

FIG. 20 depicts an Action specification stored in file action.iot. The Action specification references the actual Action resource in file action.bpel.

FIG. 21 depicts a concrete action specification for a Business Process Execution Language (BPEL) (in the file say action.bpel). BPEL has been used widely in the business world to describe activities, processes, etc. Thus, tasks may be defined as BPEL, and then the BPEL may be transformed into the Mapper model as described herein. The action model may be a BPEL process, in which actions correspond to RESTful invocations (POST, GET, PUT, DELETE) to remote Web services, then a possible plan for actions to be performed as depicted in FIG. 21. In this example, the action refers to a notification message is sent via Twilio SMS given the evaluation result of the condition.goal exceeds a certain threshold value (note the Fuzzy value at the triggerInput attribute in FIG. 20). In the case the triggerInput attribute has the value Boolean instead of Fuzzy, the result of the condition.goal has to be True for the action to be triggered.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a customized interaction between networked resources and users, the computer-implemented method comprising:

obtaining a model comprising templated resources;

abstracting, grouping, and classifying networked resources into categories using the model, the categories being defined by and conforming to a set of predefined ontologies;

instantiating an abstract resource using a concrete resource according to predefined criteria, wherein the abstract resource comprises an action, a condition, and data;

exchanging information including coordination of a respective information exchange among addressable resources by an event-driven process;

mapping the networked resources using a mapping specification including a predefined static specification and/or a dynamic specification;

selecting a subset of concrete conditions and concrete actions from a set of templated concrete conditions and templated concrete actions, according to a user profile, a type of mapped networked resources, and user defined objectives; and executing the selected subset of concrete actions according to the respective selected subset of concrete conditions.

2. The computer-implemented method of claim 1, wherein at least one of the predefined criteria comprises a specific operational context of a networked resource.

3. The computer-implemented method of claim 1, wherein the event-driven process has a capability of using a dynamic exchange and/or an ad-hoc exchange.

4. The computer-implemented method of claim 1, wherein the event-driven process is configured to use input and output plugins as interaction endpoints.

5. The computer-implemented method of claim 1, wherein the event-driven process is configured to enable ad-hoc interaction scenarios to enact at a run time and the interaction scenarios comprise essential resources.

6. The computer-implemented method of claim 1, wherein the subset of concrete conditions and the subset concrete actions are part of a goal model.

7. The computer-implemented method of claim 1, wherein at least one of the predefined criteria comprises a monetary cost of a networked resource.

8. The computer-implemented method of claim 1, wherein at least one of the predefined criteria comprises a reputation of a networked resource.

9. The computer-implemented method of claim 1, wherein at least one of the predefined criteria comprises quality of service characteristics of accessing a networked resource.

10. A system comprising:

one or more processors; and one or more computer-readable storage media storing program instructions which, when executed by the one or more processors, are configured to cause the one or more processors to perform a method comprising:

obtaining a model comprising templated resources;

abstracting, grouping, and classifying networked resources into categories using the model, the categories being defined by and conforming to a set of predefined ontologies;

instantiating an abstract resource using a concrete resource according to predefined criteria, wherein the abstract resource comprises an action, a condition, and data;

exchanging information including coordination of a respective information exchange among addressable resources by an event-driven process;

mapping the networked resources using a mapping specification including a predefined static specification and/or a dynamic specification;

selecting a subset of concrete conditions and concrete actions from a set of templated concrete conditions and templated concrete actions, according to a user profile, a type of mapped networked resources, and user defined objectives; and executing the selected subset of concrete actions according to the respective selected subset of concrete conditions.

11. The system of claim 10, wherein at least one of the predefined criteria is selected from the group consisting of: a specific operational context of a networked resource, a monetary cost of a networked resource, a reputation of a networked resource, and quality of service characteristics of accessing a networked resource.

12. The system of claim 10, wherein the event-driven process has a capability of using a dynamic exchange and/or an ad-hoc exchange.

13. The system of claim 10, wherein the event-driven process is configured to use input and output plugins as interaction endpoints.

14. The system of claim 10, wherein the event-driven process is configured to enable ad-hoc interaction scenarios to enact at a run time and the interaction scenarios comprise essential resources.

15. The system of claim 10, wherein the subset of concrete conditions and the subset concrete actions are part of a goal model.

16. A computer program product comprising one or more computer readable storage media, and program instructions collectively stored on the one or more computer readable storage media, the program instructions comprising instructions configured to cause one or more processors to perform a method comprising:

obtaining a model comprising templated resources;

abstracting, grouping, and classifying networked resources into categories using the model, the categories being defined by and conforming to a set of predefined ontologies;

instantiating an abstract resource using a concrete resource according to predefined criteria, wherein the abstract resource comprises an action, a condition, and data;

exchanging information including coordination of a respective information exchange among addressable resources by an event-driven process;

mapping the networked resources using a mapping specification including a predefined static specification and/or a dynamic specification;

selecting a subset of concrete conditions and concrete actions from a set of templated concrete conditions and templated concrete actions, according to a user profile, a type of mapped networked resources, and user defined objectives; and executing the selected subset of concrete actions according to the respective selected subset of concrete conditions.

17. The computer program product of claim 16, wherein at least one of the predefined criteria is selected from the group consisting of: a specific operational context of a networked resource, a monetary cost of a networked resource, a reputation of a networked resource, and quality of service characteristics of accessing a networked resource.

18. The computer program product of claim 16, wherein the event-driven process has a capability of using a dynamic exchange and/or an ad-hoc exchange.

19. The computer program product of claim 16, wherein the event-driven process is configured to use input and output plugins as interaction endpoints.

20. The computer program product of claim 16, wherein the event-driven process is configured to enable ad-hoc interaction scenarios to enact at a run time and the interaction scenarios comprise essential resources.

* * * * *